(12) United States Patent
Green et al.

(10) Patent No.: US 7,385,479 B1
(45) Date of Patent: Jun. 10, 2008

(54) SERVICE PERSONNEL COMMUNICATION SYSTEM

(75) Inventors: Devin Green, Charlotte, NC (US); Drew Palmer, Swarthmore, PA (US); Edmond J. Dougherty, Jr., Wayne, PA (US); Todd A. Binkowski, Charlotte, NC (US); Daniel Green, Palm Desert, CA (US)

(73) Assignee: ESP Systems, LLC, Charlotte, NC (US)

( * ) Notice: Subject to any disclaimer, the term of this patent is extended or adjusted under 35 U.S.C. 154(b) by 196 days.

(21) Appl. No.: 11/270,791

(22) Filed: Nov. 9, 2005

Related U.S. Application Data

(60) Provisional application No. 60/627,551, filed on Nov. 12, 2004.

(51) Int. Cl.
*B08B 9/00* (2006.01)
(52) U.S. Cl. ............... 340/286.02; 340/286.06; 340/286.09; 340/825.28; 340/825.69; 340/326; 340/332; 700/213; 700/216; 705/15; 705/16; 705/21
(58) Field of Classification Search ........... 340/286.02, 340/286.06, 286.09, 825.28, 825.69, 825.72, 340/326, 332, 825.29, 528.72; 700/213, 700/216; 705/15, 16, 21
See application file for complete search history.

(56) References Cited

U.S. PATENT DOCUMENTS

| | | | |
|---|---|---|---|
| 3,310,797 A | 3/1967 | Auger | |
| 3,821,707 A | 6/1974 | Peters | |
| 4,222,111 A | 9/1980 | Sloan et al. | |
| 4,254,404 A | 3/1981 | White | |
| 4,415,065 A | 11/1983 | Sandstedt | |
| 4,530,067 A | 7/1985 | Dorr | |
| 4,547,851 A | 10/1985 | Kurland | |
| 4,553,222 A | 11/1985 | Kurland et al. | |
| 4,701,849 A | 10/1987 | Elden | |
| 4,777,488 A | 10/1988 | Carlman, Jr. et al. | |
| 4,800,438 A | 1/1989 | Yuter | |
| 4,897,651 A | 1/1990 | DeMonte | |
| 4,935,720 A | 6/1990 | Kalfoun | |
| 5,128,862 A | 7/1992 | Mueller | |
| 5,272,474 A | 12/1993 | Hilliard | |
| 5,355,115 A | 10/1994 | Goor et al. | |
| 5,594,409 A | 1/1997 | Shank | |
| 5,828,294 A * | 10/1998 | Shank | 340/326 |
| 5,838,798 A | 11/1998 | Stevens, III | |
| 5,839,115 A | 11/1998 | Coleman | |
| 5,845,263 A | 12/1998 | Camaisa et al. | |
| 6,088,681 A | 7/2000 | Coleman et al. | |
| 6,253,090 B1 | 6/2001 | Nobbs | |
| 6,366,196 B1 | 4/2002 | Green et al. | |
| 6,580,360 B1 | 6/2003 | McKee et al. | |
| 6,636,835 B2 * | 10/2003 | Ragsdale-Elliott et al. | 705/15 |

(Continued)

*Primary Examiner*—Tai Nguyen
(74) *Attorney, Agent, or Firm*—Polster, Lieder, Woodruff & Lucchesi, L.C.

(57) ABSTRACT

A data processing system for analyzing customer and employee interactions in a service establishment is disclosed. The data processing system, comprises a plurality of remote customer, employee units and a central unit. The units each include a transceiver to send and receive signals. The signals are all received by the central unit and relayed to the appropriate unit. The central unit time stamps and records all signals in a database. The system further comprises an evaluation program which analyzes the signal data to provide employee performance ratings and staffing recommendations.

20 Claims, 11 Drawing Sheets

U.S. PATENT DOCUMENTS

| | | |
|---|---|---|
| 6,782,974 B2 * | 8/2004 | Leifer .......................... 186/35 |
| 6,831,549 B2 | 12/2004 | Foster et al. |
| 6,973,437 B1 * | 12/2005 | Olewicz et al. ............... 705/15 |
| 2001/0047301 A1 | 11/2001 | Walker et al. |
| 2002/0032667 A1 | 3/2002 | Walker et al. |
| 2002/0038165 A1 | 3/2002 | McHale, IV et al. |
| 2002/0077843 A1 | 6/2002 | Halverson |
| 2003/0088469 A1 | 5/2003 | Leifer |
| 2005/0046548 A1 | 3/2005 | Foster et al. |

* cited by examiner

SERVICE PERSONNEL COMMUNICATION SYSTEM

CROSS-REFERENCE TO RELATED APPLICATIONS

This application derives and claims priority from U.S. provisional application 60/627,551, filed 12 Nov. 2004, which is incorporated herein by reference.

STATEMENT REGARDING FEDERALLY SPONSORED RESEARCH OR DEVELOPMENT

Not Applicable.

BACKGROUND OF THE DISCLOSURE

This disclosure relates to service personnel data systems, and in particular, to a data processing system which allows for monitoring of personnel activity in order to facilitate training of personnel, performance review, and staffing of personnel. In addition, the system can be used to enhance service to customers to make the customer's visit to a employee location (such as a restaurant) more pleasant.

U.S. Pat. No. 6,366,196, which is incorporated herein by reference, discloses a service personnel-paging system that allows for customers to page a service provider. Monitoring and analyzing customer and employee interactions can enhance the system disclosed therein.

BRIEF SUMMARY OF THE DISCLOSURE

Briefly stated, a wireless communication system for a service establishment (such as a restaurant) enables customers patrons to communicate with service personnel (or employees) and for the service personnel to communicate with each other. In addition, the system collects data based on the communication signals between the employees and between customers and employees to analyze personnel efficiency, and to facilitate staffing and training. This data, in conjunction with data regarding the business operations enables the system to provide staffing suggestions.

Briefly stated, the system comprises a plurality of customer units and a plurality of employee units. The employee and customer units are each capable of transmitting and receiving a signal. The signal transmitted contains information identifying unit sending the signal and the type of signal being transmitted, i.e., a service request signal, a response signal, a request for assistance signal, a clear table signal, a table ready signal, etc. The employee units are, for the most part, mobile or portable units which are designed to be carried or worn by employees such as servers, managers, waiters, bussers, etc. However, the employee units can also include stationary units, such as a kitchen unit or bar unit. In addition, there can be a host/hostess (or receptionist) station. The customer and employee units all include displays for displaying messages received by the respective units. When a unit receives a signal (whether the recipient be a customer or an employee), the signal information will be displayed on the receiving unit. The units each have displays, upon which the signal information is displayed. However, depending on the signal, the information can be relayed to the recipient in other manners. The unit can include a sound generator, in which case the recipient receives a sound informing the recipient of the signal content or the receipt of the signal. The sound could be a prerecorded message which is played to the recipient, or simply a buzz or other type of "notification" sound. The recipient can also be informed of the signal or the signal content via lights, vibrations, or other means.

The system also includes a central unit comprising means for receiving the signals transmitted from a transmitting unit and relaying that signal to be received by a receiving unit. The transmitting unit will be a customer unit, an employee unit, the host station, or the kitchen or bar unit. Based upon the type of signal, the receiving unit can be a customer or an employee unit. The relayed signal contains information identifying the transmitting unit; the receiving unit, and the type of signal.

The system includes means for time stamping signals when received by the central unit. Such time stamping means can, for example, include a clock either in the central unit or the transmitting or receiving unit. Hence, time stamping of signals can be done at the central unit, the sending unit or the receiving unit. The system collects and records the data from all the signals transmitted in a database, as well as the time stamp information for each signal. Further, the database correlates the information, such that it can be determined for example, when a request signal is responded to, which unit sent the request signal, which unit responded to the request signal, and the time taken to respond to the request signal. As can be appreciated, determining the time taken to respond to the request signal is accomplished by comparing the time stamps of the request signal and the response signal. This data can broadly be categorized as employee service data.

The response signal can be transmitted in several different manners, depending on what type of signal is being responded to. If a customer request signal is being responded to, the response signal can be transmitted by the customer unit. This can be accomplished by means of proximity detectors. When the responding unit is detected to be within a predetermined distance of the requesting unit, the requesting unit can then transmit a response signal. For example, the employee unit can include an RFID tag and the customer unit can include an interrogator (or vice versa). The interrogator senses the RFID tag when the RFID tag (and hence the employee with the employee unit) is within the predetermined distance of the customer unit.

Alternatively, the employee responding to the request signal can transmit an identifying signal to the customer unit informing the customer unit that the request signal is being responded to. In response to the receipt of this signal, the customer unit can then transmit the response signal. In this second instance, the identification signal transmitted from the employee unit can be in the way of an IR beam. Hence, in this embodiment, the employee unit includes an IR transmitter and the customer unit includes an IR receiver.

The employee units are interchangeable and any employee unit can be used by any employee type (i.e., waiter, busser, manager, server etc.) This is accomplished by informing the system which employee is using which employee unit. The system maintains a database of employees and employee types. When a shift begins, an employee can "log-on" to a particular unit. Hence, the system will know which unit is used by which employee and the type of employee using the unit. This is important so that the central unit can properly relay request signals and so that employee data is associated with the appropriate employee.

The system can also include means for monitoring the location of employees within the establishment, and then record location data for the employees during their shift. Such means comprises a plurality of proximity detectors positioned about the establishment. The proximity detectors can be included as part of the customer units, stationary establishment units, or stand alone proximity detectors. As employees pass within a predetermined distance of a proximity detector, a location signal is transmitted to the central unit, and the signal is time stamped. This location signal will identify the employee unit detected (and hence the employee) and the location of the employee within the establishment. The time stamped location signal is then recorded in the database as part of the employee data. The location signal can be transmitted either by the employee unit or by the proximity detector.

The report generating means can analyze the employee location data for a single employee or a group of employees for a determined time period to generate a report indicative of the flow of travel of the one or more employees over a selected time period within the establishment. This data can be used, for example, to train employees as to potentially more efficient routes through the establishment or for other purposes.

The system also includes means for determining when an employee unit is out of range. The location signals are transmitted on a periodic basis, i.e., every several seconds, or such other interval as may be desired. If a location signal for an employee unit is not received for a determined number of interval periods, the employee unit will be determined to be out of range. When an employee is detected to be out of range, an employee-out-of-range signal can be sent to the manager. Such a signal can also be sent to one or more other employee units, and the requests for the out-of-range employee can be routed to such other employees so that they can respond to customer request signals while an employee is out-of-range.

Additionally, while an employee is detected to be out-of-range, the system will queue up requests intended for the employee. When the employee is detected to be back in range, the request signals will be relayed to the employee unit. The signals relayed to the employee unit can indicate if another employee responded to the request, or if the request still needs to be responded to. If a request as been responded to, the signal can identify which employee responded to the request.

The system also includes analyzing means (i.e., software) for analyzing the employee service data to generate reports from the employee service data. The reports can be for a single employee for a determined time period or can be a report ranking the performance of one or more employees within an establishment or within a group of establishments.

In another form, the analyzing software can analyze the data for an employee to arrive at a performance rating or score for the employee based on the employee data of an individual employee. To arrive at the employee rating or score, the system would compare the employee data (such as times to respond to customer requests, frequency of responding to employee requests, frequency of issuing assistance requests, etc.) against a determined standard. The employee rating would then be stored in the system database. In addition, the employee rating can be relayed to the employee and displayed on the employee's employee unit or other employees' units.

The system also stores historical business information. For example, such information can include table occupancy during specific time periods and for specific days of the year, table occupancy time, etc. The system can analyze this data to forecast future trends for the establishment. In addition, the system can use both the historical business information and the employee data to make staffing recommendations for the establishment. Such staffing recommendations can be further based on desired goals of the establishment at a particular time. For example, the establishment could have, as a goal, to turn tables quickly.

The system can include means to enable a manager or other employee to monitor or "shadow" an employee during the employee's shift. In this shadowing mode, signals sent to and received by a specified employee unit are relayed to a second employee unit (such as a unit being used by a manager), and the manager can then monitor the employee's signals on the display of the manager's unit. The fact that an employee is being "shadowed" can be kept from the employee, or the employee can be made aware of the fact that he is being shadowed.

In order to maintain the operability of the system, the system can be provided with means to monitor the channel, wavelength, frequency or amplitude on which signals are being transmitted to determine if channel, wavelength, frequency or amplitude becomes "noisy", i.e., exceeds a determined level of interference, and means for monitoring a range of channels, wavelengths, frequencies, or amplitudes to locate a clear or clean channel, wavelength, frequency or amplitude (i.e., a channel, wavelength, frequency or amplitude that does not have too much noise). When the system detects that the current channel, wavelength, frequency or amplitude is too noisy, the central unit will transmit a message informing the units of the system to switch to a new channel, wavelength, frequency or amplitude which has been determined to be clear. As units switch to the new channel, wavelength, frequency or amplitude, the units will transmit a "switched" signal to the central unit, indicative of the fact that it is now operating on the new channel, wavelength, frequency or amplitude. The system will operate on two channels, wavelengths, frequencies or amplitudes until all the units inform the central unit that they have switched to the new channel, wavelength, frequency or amplitude.

To further facilitate the transmissions and clarity thereof, the system can comprise multiple antennas positioned about the establishment.

Further, to ensure the integrity of the signals, the units will transmit signals two or more times in a determined period of time. Thus, if a first signal is garbled, a subsequent signal in the same burst of signals will not be garbled. Checksums and handshaking can also be used to further insure data integrity.

In another aspect of the system, the system includes means for automatically determining when a new unit (i.e., customer unit or employee unit) is added to or removed from the system. The units all have unique identification codes which are transmitted as part of their signals, and these identification codes are stored in the central unit. When a new unit has been added to the system, the central unit will determine that the identification code of that unit is not part of the database by comparing the identification signal of the new unit against the identification signals in the system's database. Hence, the system will determine that a new unit has been added to the system. When the system detects a new communication unit, the system prompts a user to enter identification information regarding the new unit. For a customer unit, such information would include, for example, table number and location (if the system were installed in a restaurant). Alternatively, the system can automatically assign identification information to the new unit.

Similarly, when the central unit determines that it has not received a signal from one of the units in its database of units, the system will determine that such unit is either inoperative, has been deactivated, or is otherwise no longer part of the system. In this instance, the system will transmit a notification that one of the units may not be operating properly or has been deactivated.

The various signals that are transmitted by the different units, and the information displayed on the various receiving units enable the system to automatically alert the employees of the establishment as to various guest conditions, employee conditions, table conditions, kitchen and bar conditions, etc., by the processing of system signals and streaming and displaying the signal related data on the receiving unit in real time.

In another aspect of the system, the customer unit can be used to solicit information from the customer. In one embodiment, the customer unit can include an interactive display, and the central unit can, at a determined time, transmit survey question(s) to the customer unit to be answered by the customer at the table. Such survey answer information may be used as part of the employee data, depending on the type of survey question(s) submitted.

In another aspect, the central unit can display items (such as food items) to the customer on the customer unit display. Such food items could be, for example, desert items, or items (food or drink) that compliment dishes that have been ordered. The customer can then use the customer unit to indicate an interest in ordering such additional items.

In a further aspect, information regarding goods or services from third party establishments (such as currently playing movies at a nearby movie theater) can be displayed on the customer unit display. The customer unit can then be provided with means to purchase such third party goods/services and means for providing the customer with a receipt for the purchase of such third party goods/services.

In a further aspect, the customers can have customer devices which contain customer identifying information. The customer unit then includes a reader adapted to read the customer device. Upon reading the customer device, the customer unit will then relay customer identification information to the central unit, and such customer identification information can be relayed to the employee unit associated with the particular table. The customer device comprises a magnetic media; a card-type device upon which is printed a bar code, an RFID tag, etc. In another embodiment, the customer unit comprises a customer's finger, eye or other body part, and the reader comprises a biometric sensor.

In yet another aspect, the system can include means for enabling a customer to pay at the table for the goods and services of the establishment. Such means would include a reader (such as the reader noted just above) which is capable of reading, for example, a customer's credit or debit card, or which otherwise enables the system to access customer billing information.

For enrolled customers, the system can maintain and update customer order information. This information can be kept on the customer device (if re-writable or programmable) or in a database in the system. Again, for enrolled customers, the customers can be awarded points based upon the customer's order information. The system can send a signal to the customer, via the customer's customer unit, of the number of points the customer has. Such points can be redeemed for value.

BRIEF DESCRIPTION OF THE SEVERAL VIEWS OF THE DRAWINGS

Corresponding reference numerals will be used throughout the several figures of the drawings.

DETAILED DESCRIPTION OF THE DISCLOSURE

Figure 1:
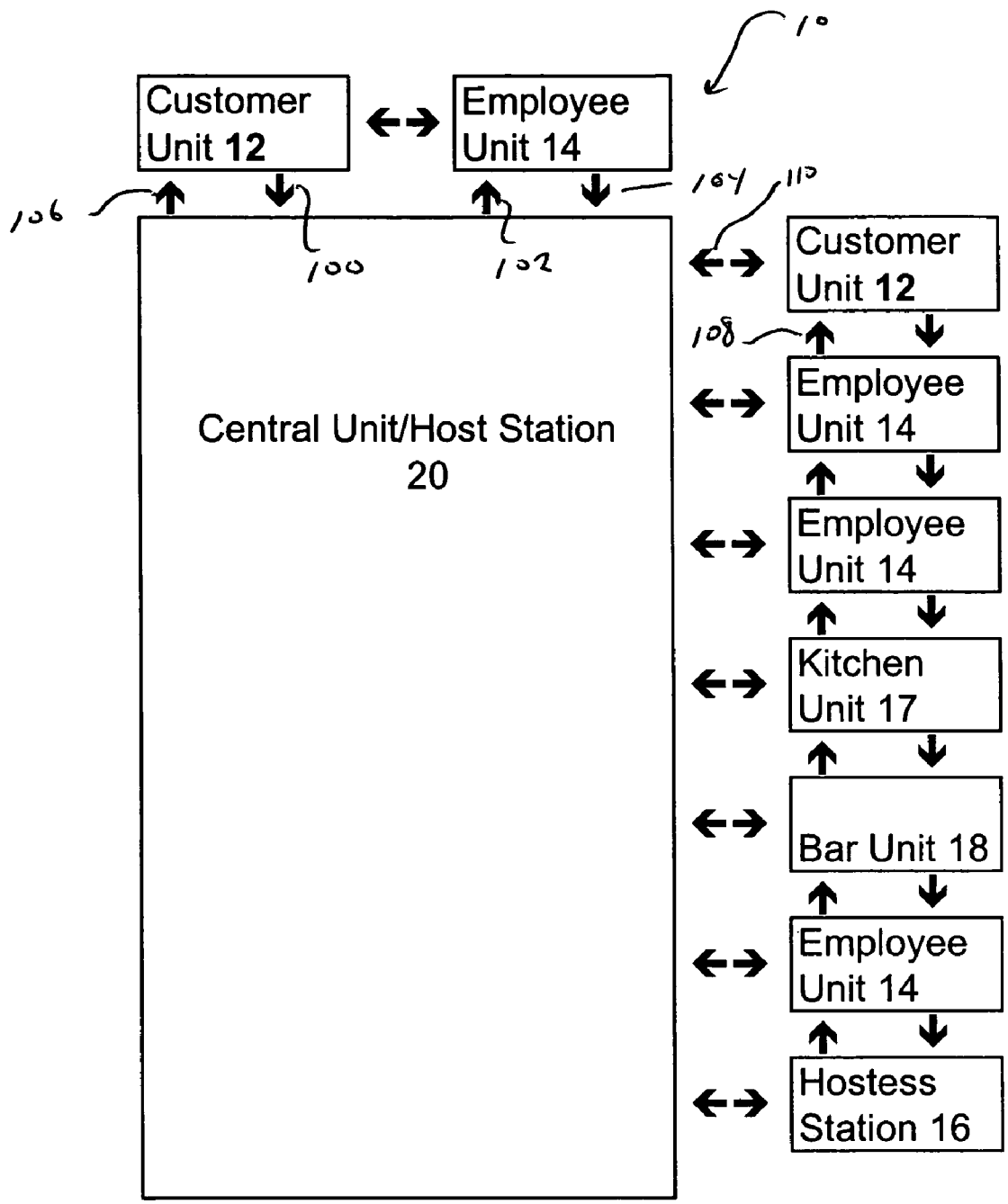
FIG. 1 is a block diagram of one embodiment of a system of the present disclosure.

The following detailed description illustrates the disclosure by way of example and not by way of limitation. This description will clearly enable one skilled in the art to make and use the system, and describes several embodiments, adaptations, variations, alternatives and uses of the system, including what we presently believe is the best mode of carrying out the system. Additionally, it is to be understood that the system is not limited in its application to the details of construction and the arrangements of components set forth in the following description or illustrated in the drawings. The system is capable of other embodiments of being practiced or being carried out in various ways. Also, it is to be understood that the phraseology and terminology used herein are for the purpose of description and should not be regarded as limiting.

A system 10 of the present invention comprises a plurality of customer units 12, mobile employee (or server) units 14, stationary units 16, 17 and 18, and a central unit 20. The system 10 will be described as used in a restaurant. However, those skilled in the art will recognize that the system 10 has applicability in other service industries, such as hospitals, air planes, trains, cruise ships, and hotels/motels. It can also have applicability in the manufacturing industry. In the restaurant industry, a customer unit 12 will be positioned on each table in the restaurant; each server, busser, manager, etc. on duty will be provided with a mobile employee unit 14; the stationary units 16, 17 and 18 can be hostess station, kitchen unit and bar units, respectively. Throughout this disclosure, words such as personnel, server, busser, manager and employee are to be used interchangeably.

Figure 2:
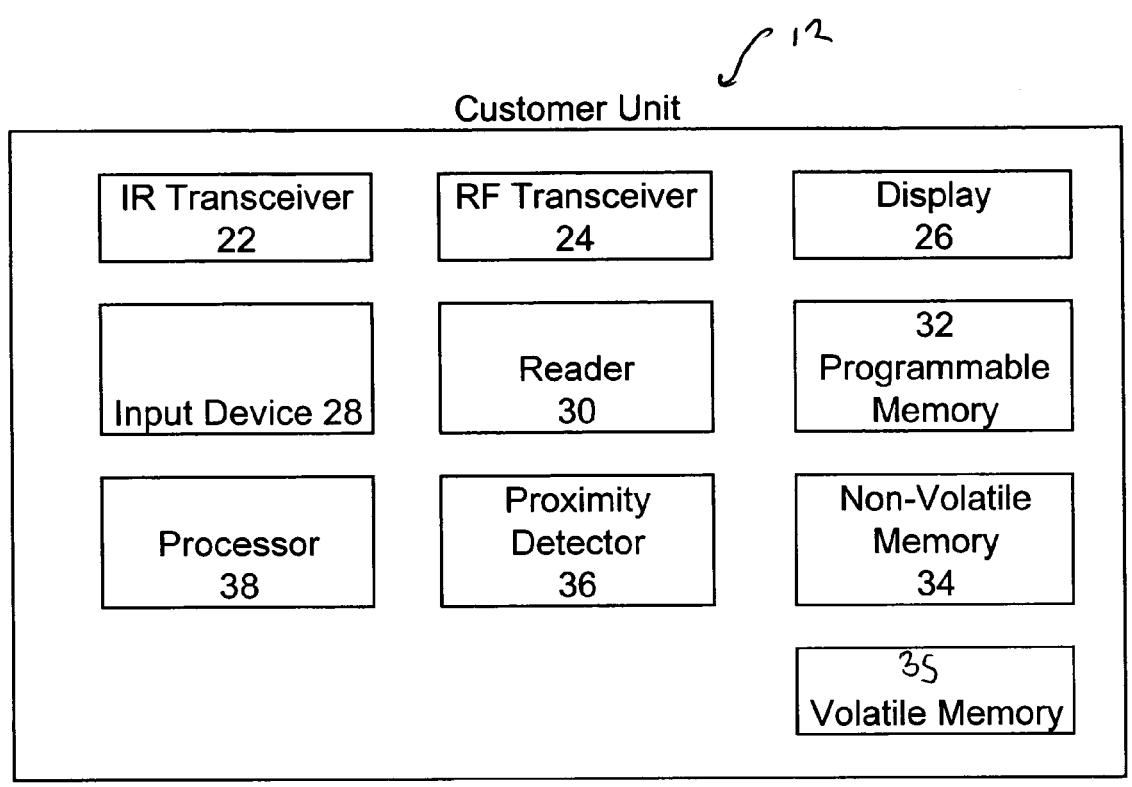
FIG. 2 is a block diagram showing components that can be included in the customer unit.

Turning to FIG. 2, the customer unit 12 can be provided with IR and RF transceivers 22 and 24, a display 26, an input device 28, a reader 30, programmable, non-volatile and volatile memories 32, 34 and 35, a proximity detector 36 and a processor 38. The input device 28 can comprise a button (which when pressed activates the RF transceiver to transmit a request signal), a keyboard, or any other type of input device. In addition, the display 26 can be a touch screen display, and hence, the display 26 can also be an input device. The programmable memory will include data identifying the unit. If the display includes a touch screen, then the button used to activate the unit 12 can be a "soft" button which appears on the screen.

Figure 3:
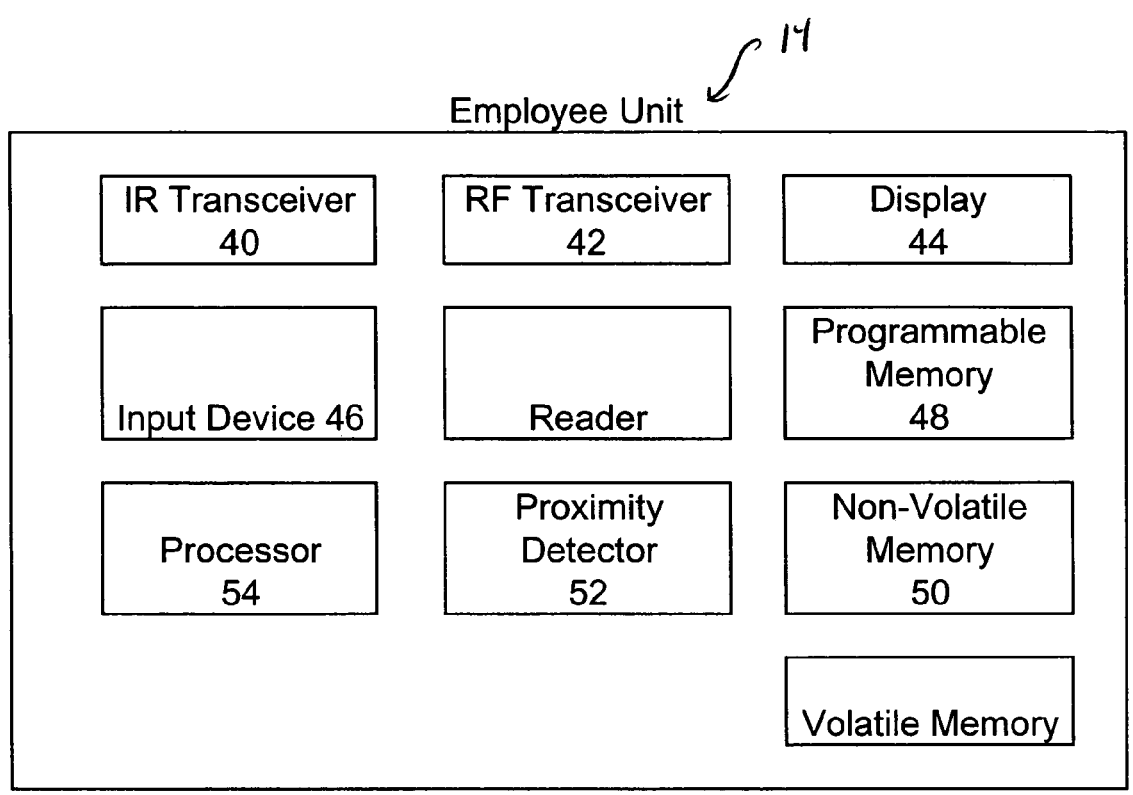
FIG. 3 is a block diagram showing components that can be included in a employee or service personnel unit.

Turning to FIG. 3, the employee unit 14 can be provided with IR and RF transceivers 40 and 42, a display 44, an input device 46, programmable, non-volatile and volatile memories 48, 50 and 51, a proximity detector 52 and a processor 54. The input device 46 can comprise a button or buttons (which when pressed activates the RF transceiver to transmit an employee signal) or any other type of input device. In addition, the display 44 can be a touch screen display, and hence, the display 44 can also be an input device. As with the customer unit 12, if the employee unit 14 includes a touch screen, some or all of the various buttons can be "soft" buttons which are activated by pressing the button on the display. As will be described below, in a restaurant, the employee unit can be used by servers, bussers, managers, and the host/hostess, although there is also a host/hostess station. The employee unit memory will include data identifying which unit, which can then be correlated to the employee using the unit at the time by means of a look-up table.

Figure 4:
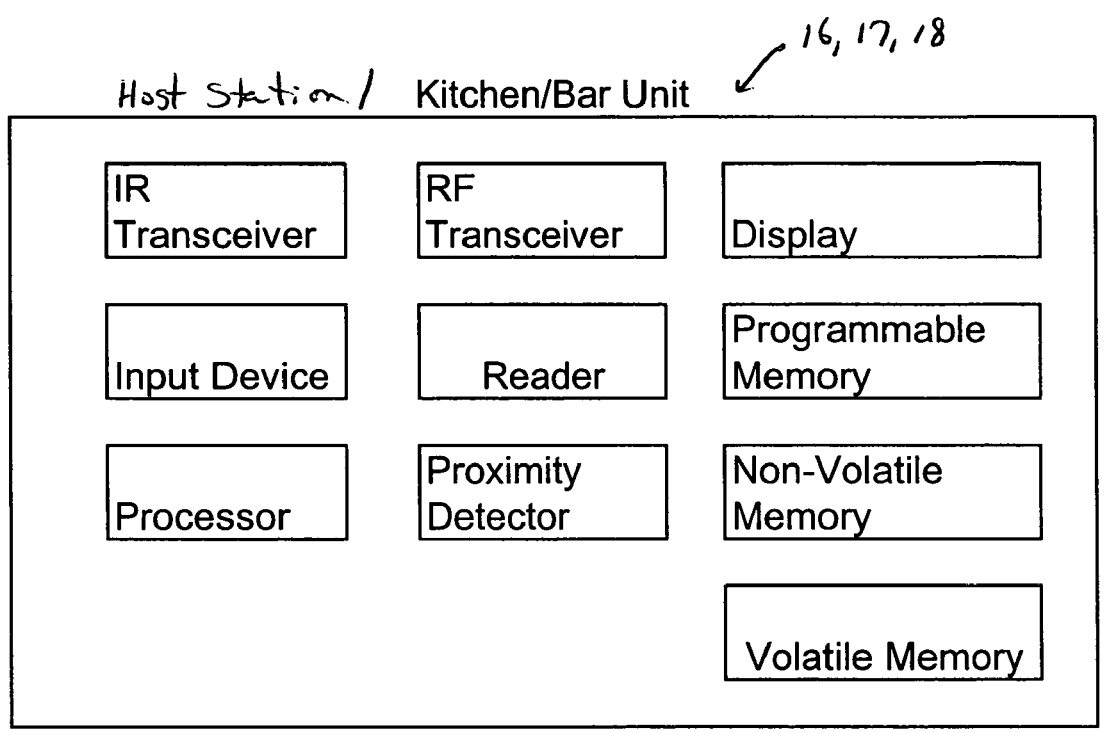
FIG. 4 is a block diagram showing components that can be included in a host station unit or a kitchen/bar unit.

Turning to FIG. 4, the host station and kitchen/bar units 16-18 are generally identical to the employee unit 14, and can contain the same components as noted above with respect to the employee unit 14.

Figure 5:
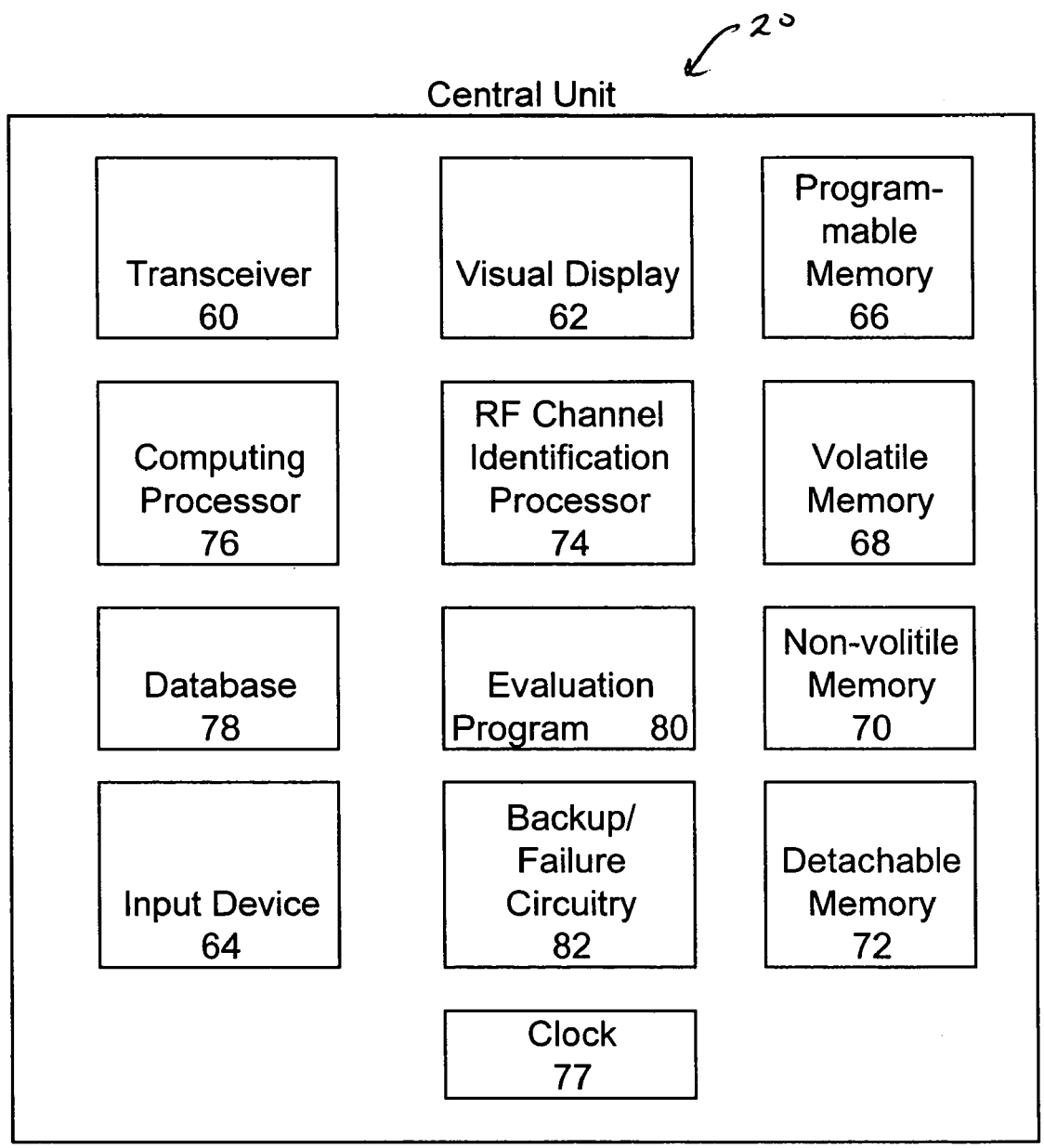
FIG. 5 is a block diagram showing the components that can be included in a central unit.
Figure 6:
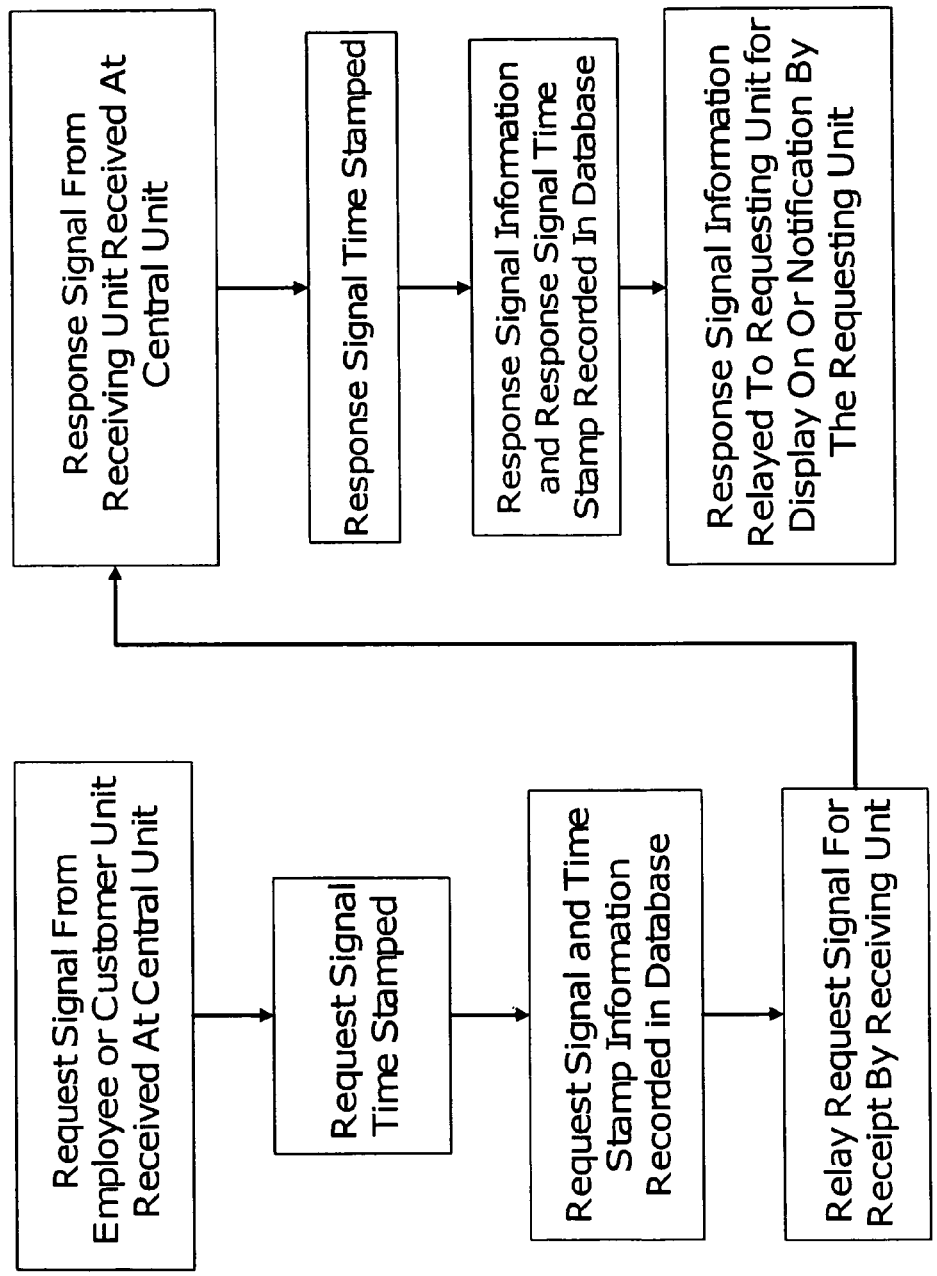
FIG. 6 is a flow chart of the processing of signals between customer units and employee units and between employee units.
Figure 7:
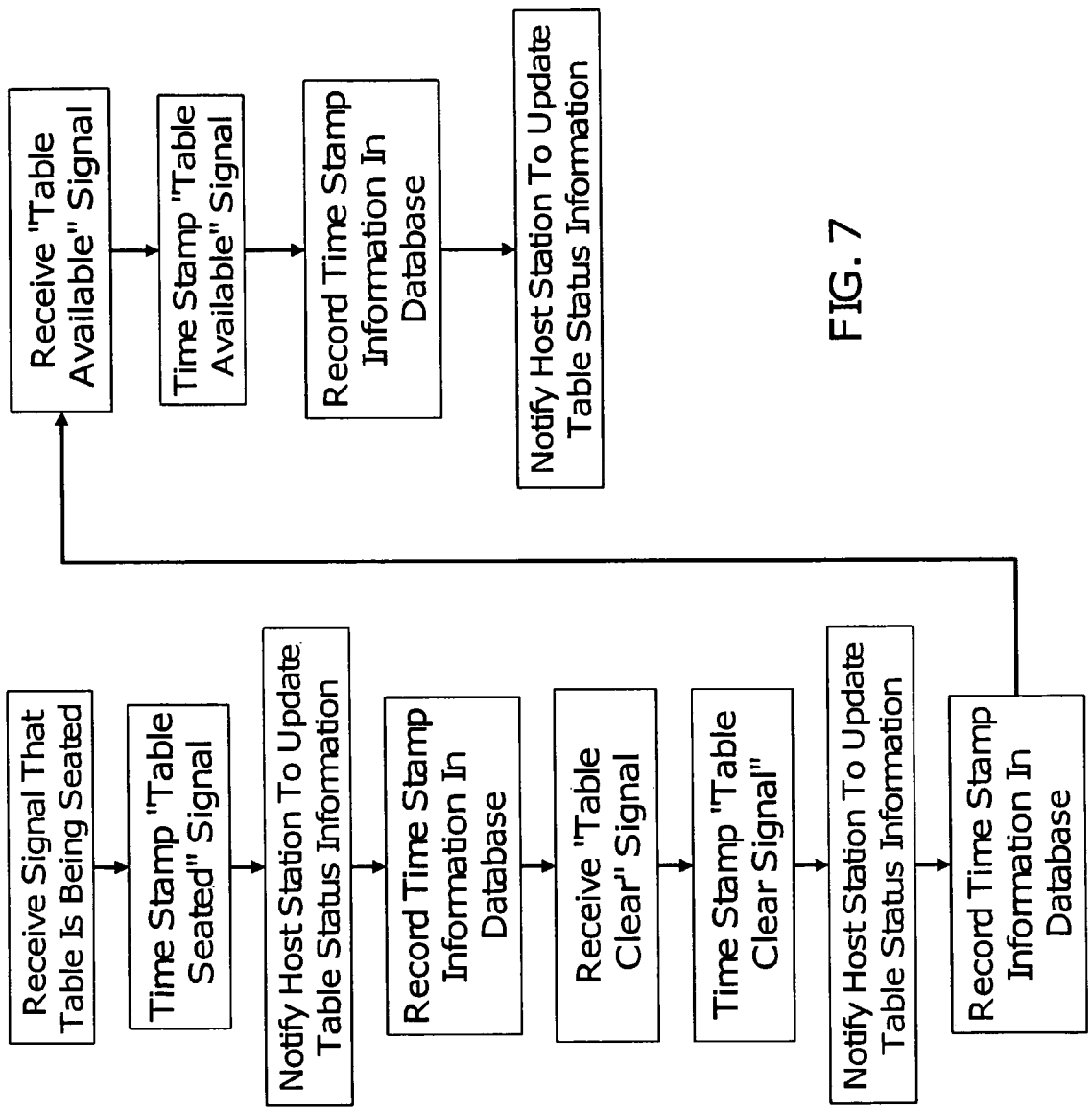
FIG. 7 is a flow chart of the processing of signals related to table occupancy.
Figure 8:
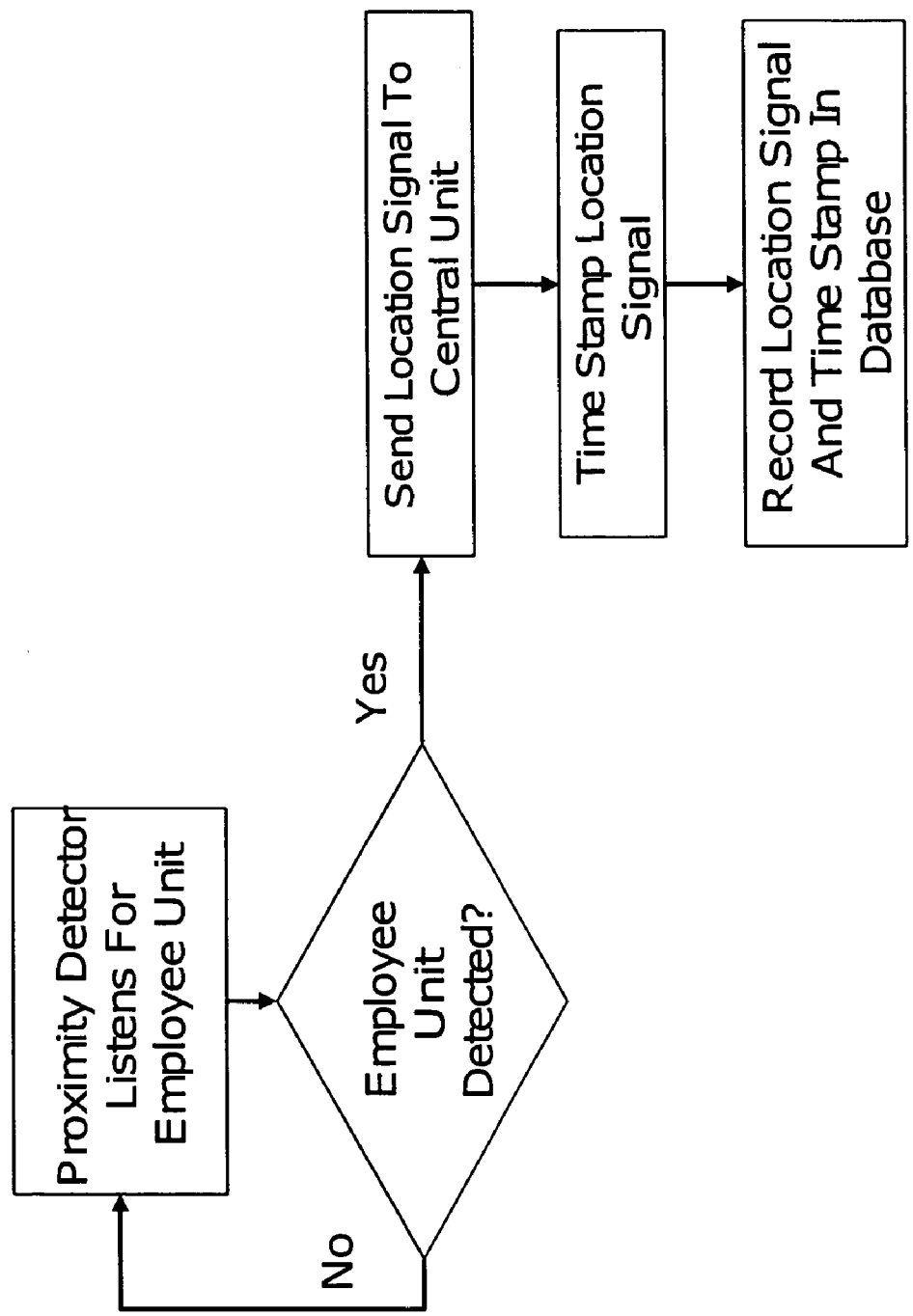
FIG. 8 is a flow chart of the processing of signals related to employee location information.
Figure 9:
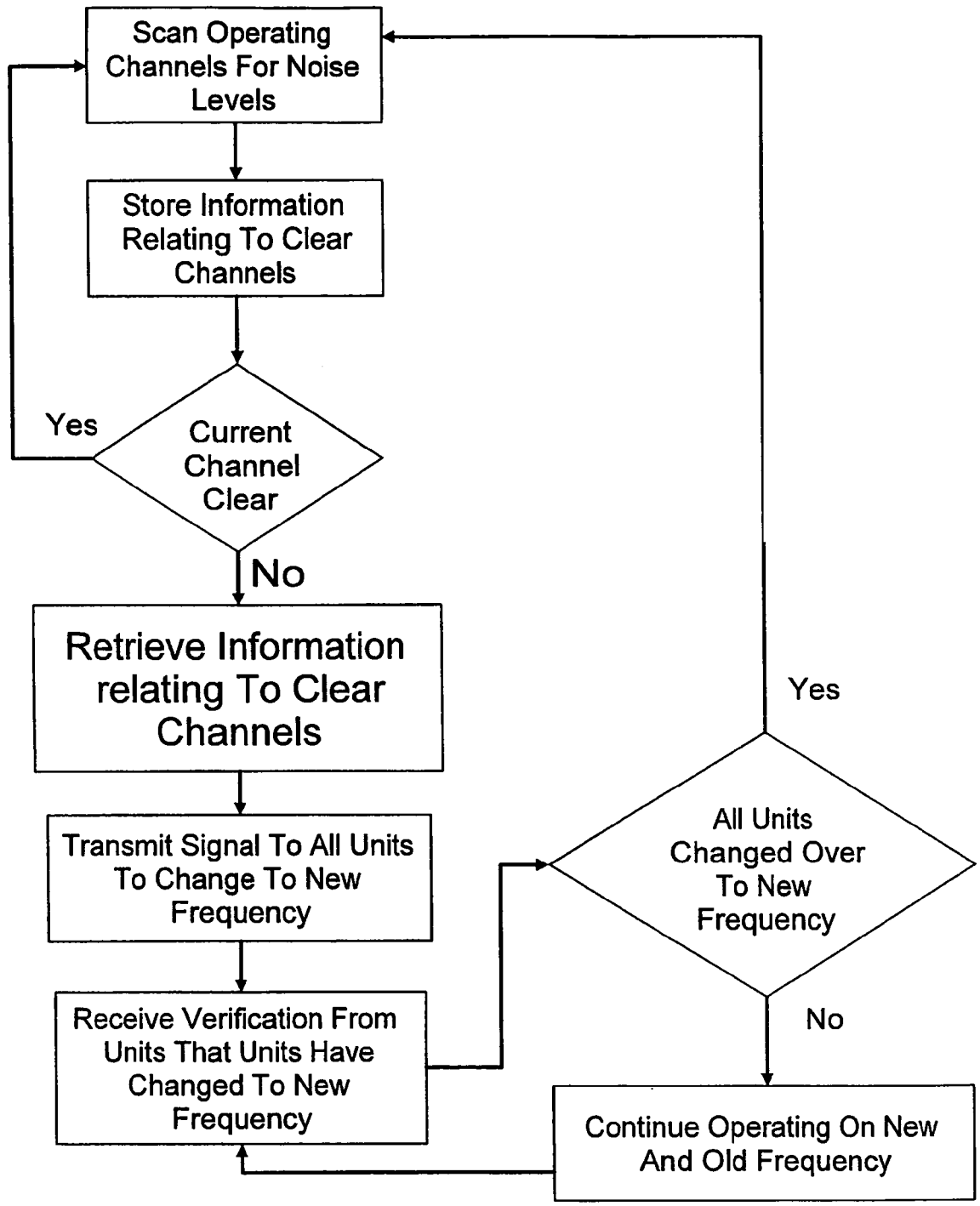
FIG. 9 is a flow chart showing frequency scanning to enable communication to switch from a noisy channel, wavelength, frequency or amplitude to a clear channel, wavelength, frequency or amplitude when the first channel, wavelength, frequency or amplitude is determined to be too noisy.
Figure 10:
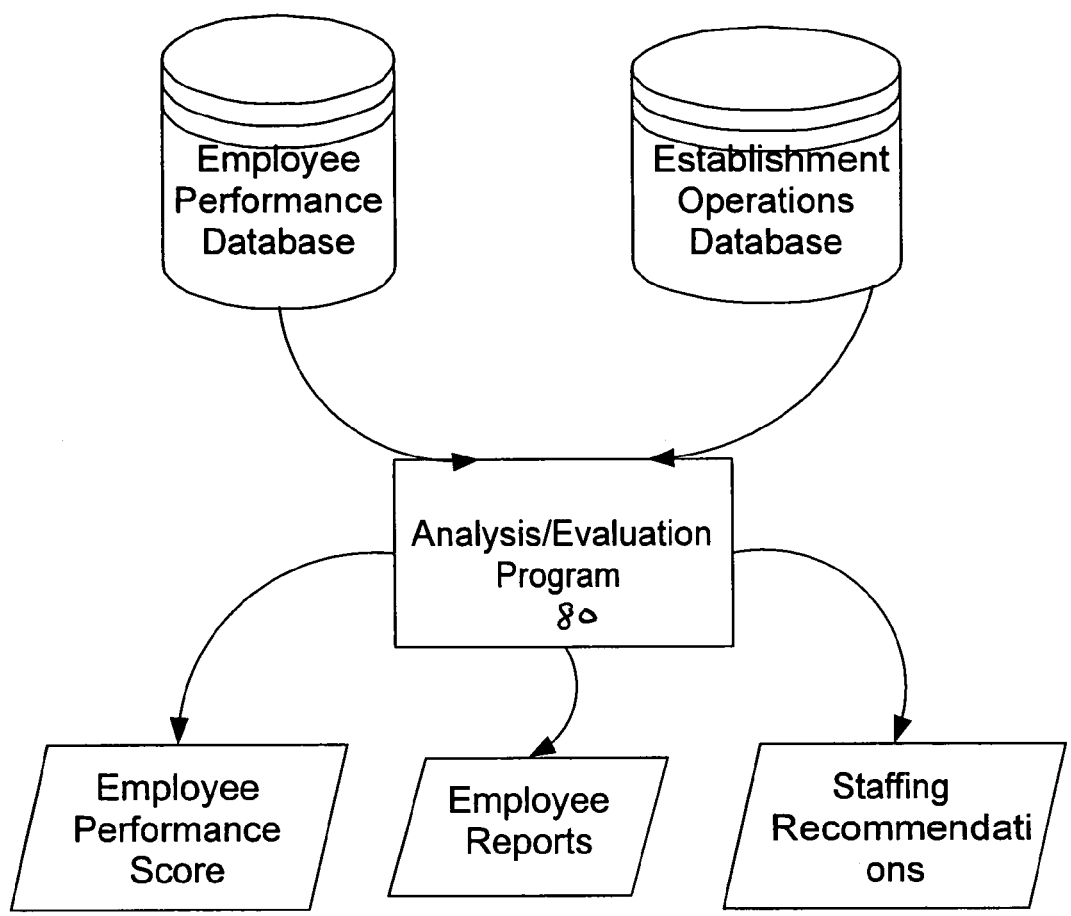
FIG. 10 is a block diagram showing how recorded data is used to generate productivity and recommendation scores and reports.

Lastly, the central unit 20 (FIG. 5) can be provided with an RF transceiver 60, a display 62, an input device 64, programmable, volatile and non-volatile memories 66, 68 and 70, a detachable memory 72, an RF channel identification processor 74, a computing processor 76, and a clock 77. A database 78 is stored in one of the memories and can contain data regarding customer/employee signals and response times, employee performance data, employee location data, customer data (i.e., sales data) and establishment operations data. An evaluation program 80 is also stored in one of the central unit memories. The database can be any type of database, and can be based in any desired database programming language. Lastly, the central unit 20 can also include a backup/failure circuit 82 to protect the integrity of the database and evaluation program in the event of power surges, power outages, etc. Each employee unit 14 assigned to a server or busser is associated with a plurality of customer units 12 (to assign servers and bussers to different groups of tables). The central unit, in its memory, includes an employee/table (or employee unit/customer unit) association table, such that the system will know which employees are associated with which tables.

In a restaurant, the communication between the customers and employees (servers, bussers, etc.) works generally as described in the above noted U.S. Pat. No. 6,366,196, which is incorporated herein by reference. Essentially, a customer (i.e., diner) requests service by activating the RF transmitter 24 of the customer unit 12. This can be done, for example, by pressing a button on the customer unit 12. The customer unit 12 then sends a customer request signal 100 (FIG. 1). The request signal will include information identifying the unit which transmitted the signal and the type of signal being transmitted (in this case, a request signal). The customer request signal is received by the central unit 20. The request is time stamped and, based on a table/server look-up table, the request is mated with the employee who services the particular table. The central unit then transmits a central unit request signal 102 which contains information identifying the customer unit requesting service, the employee unit for whom the request is intended, and the type of signal (in this case, a service request). The various employee units 14 receive the request, but, as described in the aforementioned U.S. Pat. No. 6,366,196, the request information is received and displayed on the unit 14 of the server responsible for the particular table. The employee unit 14 maintains the requests in a queue, and displays them in the order they are received. However, when a new request is received, the request will be displayed in a larger format enabling the server to quickly look at the display to see which table has requested service. After a predetermined period of time, the display of queued requests will return to the smaller, normal type size, and the latest received request will be placed in the queue. The request can blink until the request is served to notify the server that the request remains unserved.

If the employee cannot respond promptly to the request, the employee can send an "I'm busy, I will get to you shortly" signal 104. This "busy" signal 104 will be received by the central unit 20, and then relayed, as at 106, to the customer unit. The customer unit 12 will then display a message, such as "I will be with you shortly" or the like, to let the customer know that the request has been received. The "busy" signal can be provided to the customer in one or more ways. For example, the customer unit display can provide a visual image (as text and/or graphics), the customer unit can have a light that is activated, the customer unit can include an audio message to the customer; or the customer unit can vibrate or provide some other type of tactile indicator. Thus, the message to the customer can be a tactile, visual, and/or auditory message.

When the employee responds to the service request, the system will be notified of the fact. The server will activate the IR transceiver 40 of the employee unit 14 to transmit an IR beam 108 which is received by the customer unit IR transceiver 22. Upon receiving the signal 108 from the employee unit, the customer unit will send a "request answered" signal 110 to the central unit 20. The request answered signal is time stamped, and the system can thus determine how long it took to the server to respond to the request. As discussed below, the response time can also be determined using proximity detectors.

Similar communications can occur between the employee units 14 and kitchen and bar units 17 and 18. However, in this instance, the kitchen or bar unit will send a signal indicating that an order is ready for pick up. The request will be relayed by the central unit to the proper employee within the restaurant. Upon picking up the order, the employee will send an IR signal to the kitchen/bar unit, and the central unit will then be informed that the order has been picked up.

As can be appreciated, the "request answered" signal can be transmitted in different ways as well. For example, the employee unit can transmit the signal directly to the central unit using its RF transceiver 42. The employee units each have the capability to clear the request from its queue once the request has been responded to. The transmission of the "request answered" signal can also be activated by the clearing of the request from the queue.

When a customer has paid and left, the server can emit a "bus" signal which is relayed to a busser via the central unit. The busser will then be informed that a table is ready for bussing. When the table is bussed, the busser will activate his unit to send an IR signal to the customer unit 12. The customer unit 12 will then transmit a "table ready" signal to the central unit.

All the signals are time stamped, and the signal information (including the time stamp for the signal) is stored in the database 78 on the central unit. Using the time stamped information, the system 10 can determine how long employees take to respond to service requests and whether they generally initially respond using the "busy" signal before actually responding to the request. Thus, the system 10 enables managers to measure how quickly their employees are responding to customers' requests and therefore how effectively their current staffing model is catering to customers' feelings of time sensitivity. Depending upon what managers believe to be an acceptable response time, the managers may use this data to adjust their staffing model accordingly.

Customers at retail establishments are often very time sensitive. Once customers request service, how quickly an employee responds to that request can significantly impact the customer's shopping/buying experience. The present data processing system 10 measures how quickly an employee responds to the customer's service request signal 100.

In addition, as customers are seated at tables, the system will be informed that the various tables have been seated. This information will also be time stamped and stored. Further, through the table ready signal, the system will be informed when a table has been cleared, and ready for reseating. Based on this, the system can determine how fast tables are turned. Hence, the system can maintain data of table turning times, and the times can be averaged by day, week, month, time of day (i.e., breakfast, lunch, dinner, etc.), etc. In addition, by maintaining data on table usage, the system will create and maintain a database showing how busy the restaurant was on specific days.

Proximity Detection

As noted above, the table units 12 and employee units 14 include proximity detectors. The proximity detectors 36 and 52 of the customer and employee units 12 and 14, respectively, each include one half of a detector pair. For example, the employee unit detector can comprise an RFID tag, and the customer unit detector can comprise an interrogator. In this instance, when a employee unit is within a predetermined distance (e.g., six feet) of the customer unit, the customer unit will detect the presence of the particular employee and transmit a locator signal to the central unit indicating that the particular employee was, at that moment, near the particular table. Conversely, if the RFID tag is in the customer unit and the interrogator is in the employee unit, then when the employee unit is within a predetermined distance of the customer unit (i.e., the a table), the employee unit will transmit a locator signal informing the central unit that the employee is at a particular location in the restaurant. These locator signals will be time stamped. Time stamping, as noted above, can be performed by the central unit, the customer unit or the employee unit. The Figures show the clock being in the central unit. However, if time stamping is to be performed by the various units (i.e., employee and customer units), then these units will have their own clocks, in addition to or in replace of the clock in the central unit, or the units can otherwise receive a time signal from the central unit enabling the individual units to time stamp the signals. As can be appreciated, other technology, which detects the presence of an employee unit within a predetermined distance of the customer unit, can also be used.

Whenever a server is located within a certain proximity to one of the customer units 12, that customer unit 12 will not only recognize that an employee is within that proximity, but it will also recognize which specific employee it is. Thus, once a customer request signal 100 is generated by the customer pushing or otherwise activating the customer transceiver 24, the system time-stamps the event. Using the time stamp of the location signal, the system can determine how long it takes for before a server is detected within the given proximity (therefore measuring how long it took for a server, and specifically which server, to respond to the customer request signal).

As such, a customer sitting at a table activates the customer transceiver 24 to request service. The service request signal is relayed to the server's employee unit 14 as described above. That event triggers a time-stamp by the system for that specific customer signal 100 and the central unit 20 records that data. Assuming after 62 seconds, the server assigned to that customer unit 12 responds to that customer signal 100 and is located within the proximity of the customer unit 12 (for example 8 feet), then the central unit 20 collects and records the response time for that specific server. It should be noted that proximity detectors can be placed throughout the restaurant, including the kitchen, bar, point-of-sale ("POS") terminals, host station, etc. and is not simply limited to the tables in the form of the customer transceiver.

Multiple Signal Transmission

Preferably, when activated, the customer, employee, kitchen, and bar units send out their respective signals in multiples. That is, when activated, the units (i.e., the employee units, the customer units, the central unit and the stationary units) will send out signals multiple times in short succession. The central unit 20 monitors the frequencies to filter out noise, for example by averaging signals received over a discrete time period such as one second. Thus, if one of the signals sent by one of the units is scrambled, for example, by the starting a piece of equipment within the establishment, the other signals will not be scrambled, and the central unit 20 will receive the signal for processing. Additionally, filtering or averaging the signals reduces the possibilities of receiving and transmitting false signals. Further, the use of checksums and handshaking helps ensure data integrity. Additionally, the system can include multiple antennas located throughout the establishment to improve system coverage and performance.

Radio Frequency Channel Searching

The central unit 20, as noted above, comprises a radio frequency system or RF Channel Identification Processor 74 that scans a frequency spectrum to locate a clear channel/frequency/wavelength/amplitude for wireless communication among the plurality of customer units 12, the plurality of employee units 14, the stationary units 16-18, and the central unit 20. While the system 10 is in operation, the central unit 20, through its Channel Identification Processor 74 continuously scans for wireless interference on specific channels/frequencies/wavelengths/amplitudes. In particular, the processor 74 monitors the channel/frequency/wavelength/amplitude currently being used for interference and monitors other channels/frequencies/wavelengths/amplitude to determine which channels/frequencies/wavelengths/amplitudes are clear of interference. If credible interference sources are found on the operating channel/frequency/wavelength/amplitude, then the central unit 20 instructs each various units 12, 14, 16, 17 and 18 to switch over to a new channel/frequency/wavelength/amplitude that does not have any measured interference on it. As the customer and employee transceiver switch to the new channel/frequency/wavelength/amplitude, they notify the central unit that they have switched over to the new channel/frequency/wavelength/amplitude. The system operates on both channels/frequencies/wavelengths/amplitudes until all devices have confirmed that they have transferred over to the new channel/frequency/wavelength/amplitude. The RF Channel Identification Processor 74 then scans for new clear channels/frequencies/wavelengths/amplitudes it can switch to should the now current channel/frequency/wavelength/amplitude begin to get interference.

The system 10 utilizes multiple antennas (diversity) as a means to optimize the radio frequency performance. Furthermore, the central unit 20 utilizes a system identification means to prohibit interference with other nearby data processing systems. That is, each individual system (i.e., each system installed in an individual establishment) has its own unique identifier, and this system identifier is made part of each signal transmitted by the system. Any signal which does not include the system identifier for the system of an establishment will be discarded by the system of that establishment, and will not be processed. Hence, should two neighboring establishments each have an installed system, the signals from the two establishments can be differentiated from each other, and the signals of each establishment will be ignored by the system of the other (i.e., neighboring) establishment.

Programmable Units

As noted above, restaurants have different types of employees (i.e. manager, host/hostess, server, bar/kitchen) with different responsibilities. In order for the system 10 to offer the ultimate flexibility, the employee units 14 are programmable on the fly so that they can be used by different types of employees, rather than being hard-coded to a specific function and/or employee-type. When an employee begins use of an employee unit 14, the employee "logs-on" to, or otherwise informs the system 10 which unit 14 the employee will be using. This will map the particular unit 14 to the particular employee. Hence, the system will know what the unit will be used for (i.e., as a waiter unit, a busser unit, etc.). With the unit mapped to the particular employee, the system will be able to direct or relay signals appropriately. After a shift is over and a new employee arrives at the restaurant to replace the existing employee, all that new employee has to do is take the employee transceiver 14 from the existing employee and reprogram it to him or her by logging on to the unit. Logging on to a particular unit can be accomplished at the unit itself or at the central unit for the system. Regardless of whether or not that new employee is a manager, busser, server, or host (or some other employee type), the employee can use any employee unit.

Additionally, the employee transceiver's battery power can be rechargeable. However, should a particular unit have insufficient power, the employee can stop use of the particular unit 14 and begin use of a new unit 14 by mapping the new unit to the particular employee. Mapping of the new unit to the employee can occur either manually or automatically.

As noted above, particular employee units 14 are mapped to particular customer units 12, such that certain employees will be responsible for a certain set of tables. During operation, the system 10 can be operated to reprogram the employee units 20 to alter the employee unit/customer unit association. This relationship adjustment can be performed locally at the host station or at a manager's computer. Alternatively, the relationship adjustment could be performed remotely, over a wide area network or via the Internet. This can be done on the fly and/or at specific times (i.e. off-shift) without disrupting the operations of the system 10.

Automatic Configuration

The customer and employee units are all assigned unique identifiers in the form of serial numbers; and the identifiers for the various units are stored by the system 10. Additionally, each system is provided with its own unique system identifier. The identifiers for the various units are tied to a table (in the case of a customer unit) or a section (in the case of an employee unit). The device/table and device/section associations are stored in a lookup table.

Devices can be added to, or removed from, the system manually or automatically. In the case of a manual addition of a device, the device identifier is manually entered into the system (for example at the central unit) and the device is then tied to a section (in the case of an employee unit) or a table (in the case of a customer unit) in the look up table. In addition, an alias identifier can also be entered into the system. For example, the alias identifier for a customer unit could be the table number to which the customer unit is assigned. To manually remove a device from the system, its identifier is removed from the system and from the lookup tables.

If a device is not manually entered into or removed from the system, the system 10 can, nevertheless detect the new device (or the removal of an existing device). When a new unit (a customer unit or employee unit, for example) is activated or powered up, the device will transmit its identifier (i.e., serial number), the system will detect the new unit, record the serial number and assign an alias identifier to the unit based on a predetermined algorithm. When a new unit is detected, the system can prompt the user (i.e., manager or programmer) for an alternative alias identifier for the new unit. For example, if the new unit is a customer unit, then the manager can inform the system the table to which the unit has been assigned. If a device has been declared as lost, and the system detects a new device, the system will prompt a user as to whether this newly detected device is intended to replace the lost device. If the new device is intended to replace the lost device, the system will automatically map the new device to the same place as the previously lost device. Hence, a new employee unit will be mapped to the same section as the lost employee unit being replaced, or a new customer unit will be mapped to the same table as the customer unit being replaced.

If a device is declared as being lost, the system will automatically prompt a user as to whether the device should be removed from the system. If the device is to be removed, then it can be replaced either manually or automatically, as noted above. A device is deemed by the system to be lost if a signal has not be received a signal from the device in question for a determined period of time.

Still further, the present data processing system 10 monitors whether any of the devices fail. Upon failure of any device, the other devices are notified and standby devices can be activated to replace the failed devices. For example, if the central unit 20 fails, then a failure notification is sent to the respective customer transceivers 16 and employee transceivers 18 while the system 10 activates a back-up central unit.

Customer Backlog Indicator

The system 10 allows employees who are currently helping customers to know if other customers are waiting to be helped. Without this capability, waiting customers may choose to leave the establishment. The display 44 of each employee unit 14 includes an indicator or icon that is activated to be visible if patrons are waiting to be seated. This "patron waiting" signal is issued by the host/hostess at the host/hostess station 16 and is received and displayed on all the waiter's employee units 14. When there are no patrons waiting, then the host/hostess can deactivate the "patron waiting" signal, which, in turn, will cause the "patron waiting" icon on the employee unit display 44 to turn off. The use of the "patron waiting" signal can work in reverse. That is, the host/hostess station can transmit a signal indicative of the fact that there is no backlog (i.e., no one is waiting for a table), and deactivate the signal when there is a backlog. The backlog signal and icon provides servers with the information that if they expedite service and turn their tables faster than they otherwise would, then the servers may be able to have another one of their tables seated. If the server does not have an icon visible, then the servers know they can focus on building rapport with their existing customers and not worry about making themselves available for new customers.

If a server is serving a table (i.e. an existing customer) and they see that the employee response 46 in the form of the "Waiting Backlog" indicator is on the display of the employee unit 14, this indicator may cause the servers to ask their existing tables near the end of their meal to drop the check early in order to expedite the table turn process. On the other hand, if the server does not see the "Waiting Backlog" indicator, then they can focus on "building the tip" at their existing tables by spending more time with each customer. This "Waiting Backlog" signal would equip hourly servers with the ability to customize their customer service to the real-time situation, often leading to higher customer satisfaction and hourly server income (e.g. through higher tips or more up-sells).

The system 10 is also configured to monitor the number of customers located in the sales environment 12 through one of the employee transceivers positioned at the host station. The system 10 provides data related to the number of customers and the number of tables occupied to the employee transceivers positioned throughout the sales environment 12.

Employee Communication Via Customer Units

Employees of retail establishments often have trouble communicating with fellow employees on the floor during business hours. In many retail establishments, having a hands-free and/or wireless solution to communicate with fellow employees can be very valuable.

As noted above, each employee unit 14 can include an infrared emitter (i.e., IR transceiver 40). When activating the IR transmitter 40 while aiming the employee unit at the customer unit 12, the employee unit 14 will transmit an infrared beam to the customer unit 12 to transfers data from the employee unit 14 indicative of a signal to be sent to the central unit 20. The customer unit 12 can then send out, in response, a signal that is transmitted to the central unit 20. The central unit 20 can then relay the signal as necessary and record the data in the proper database. The data transmitted by the customer unit 12 to the central unit 20 will include the table number and the type of signal initiated by the attendant.

For example, when the server wants to let the busser know that the table is ready to be cleared and reset, the server presses a button on the employee unit 14, transmitting an infrared beam to that table's customer unit 12. An infrared receptor (i.e., IR transceiver 22) in the customer unit 12 receives the data from the employee unit 14 and then relays a "table ready for bussing" signal to the central unit 20. The central unit then relays this message to the busser, and the signal will then be displayed on the busser's employee unit 14. Similarly, once the busser has cleared and reset the table, the busser can activate his/her unit 14 to transmit an IR beam to the customer unit 12. This IR beam would be a "table ready" signal, and the customer unit would then relay this signal to the central unit 20, and the information would be displayed on the host/hostess station.

It will be appreciated that the same set of signals could be transmitted using the RF transceivers of the employee and customer units.

Communication from Employee Unit to Customer Unit

Sometimes employees may be busy performing other tasks and they currently have no way of communicating back to their customers that they are busy and it might be some time before they are able to provide them with assistance. Without this communication capability, customers' expectations might cause them to become dissatisfied with their experience, negatively affecting the business of the retail establishment.

Each employee unit 14 can be activated (for example, by way of a button), to communicate to the customer unit 12 that the employee is busy and will not be immediately available for some time certain. The customer could receive the message in a visual, auditory, or tactile manner. In this instance, the waiter would transmit a "busy" signal, and the customer would then be notified that his/her server is busy. The customer unit can display a "countdown" in its display 26 following a service request or at other times to help manage their expectations by defining their expectations. This "busy" signal could also be communicated to other employee units.

Thus, for example, if a server is in the kitchen or at the bar and the server knows they will be unable to service any customer service requests from their tables for at least the next few minutes, then the server activates the employee unit 14 to transmit a "busy" signal, which is then relayed to the customer unit 12. The customer unit 12, in response to the receipt of the "busy" signal" displays a message to the customers saying "Patience please . . . . I will be busy for a few minutes," or the like This message can be relayed to all the waiter's tables, or only to those tables which issue a service request. This information may be wirelessly distributed to other components of the system 10, including the manager's computer and/or unit 14.

The communication from employee to customer helps manage customers' time expectations and provides a discrete and remote method for employees to communicate with their customers whenever they deem it appropriate. This communication helps avoid service bottlenecks and improve customer service.

Manager Shadowing

The system 10 also allows a manager to "shadow" one or more of the employees. In this instance, the manager's unit 14 will receive signals sent to a designated employee's unit 14. The shadowing of the employee by the manager may remain anonymous (i.e., the system 10 need not inform the employee that signals directed to his unit are also being received by the manager's unit). Alternatively, the manager may notify the employee that the manager is also receiving messages sent to the employee's unit. The ability to shadow an employee can facilitate training of the employee or improving the employees performance, as well as simply monitoring the messages received and sent by an employee.

Automated Flow-Mapping Capabilities

The system 10 can enhance productivity by eliminating unnecessary trips to different locations in the establishment by illustrating the shortest path between two points when employees travel between locations within the establishment. As noted above, the system 10 is able to detect the location of each device (customer unit 12, employee unit 14, etc.) allowing the system 10 to determine where employees are within the establishment at any given moment and which employee responds to a customer service request. Additionally, the system 10 is able to detect which employees are positioned in the kitchen, which employees are bussing tables etc. The system 10 detects movement of the employee units by aggregating time and location data at predetermined intervals.

As noted above, the employee units 14 and customer units 12 are provided with proximity detectors which interact to notify the central unit the location of the employees within the establishment at a particular moment in time. In addition, stand alone proximity detectors (i.e., detectors not associated with a customer unit, kitchen unit, bar unit, etc.) can be positioned at various locations within the establishment if necessary for an accurate determination of where employees may be within the establishment. The employee unit 14 will transmit a location signal at certain intervals that is received by the central unit 20. As the waiter moves throughout the restaurant, the employee unit's location signal is picked up by the central unit 20 and time stamped. The central unit will maintain the time stamped employee location information in a database. As can be appreciated, each stationary proximity detector (i.e., the customer unit) is mapped to a location within the establishment. Hence, by correlating the identity of the proximity detector which emits the location signal with the mapped location in the establishment, the system can determine where in the establishment the employee is at that particular time.

Using this employee location information, the system can generate a report to enable a manager to see how an individual server moves around the establishment, how long the particular server stood idle in one location, etc. The system can also issue a report which shows the overall paths taken by the employees as they moved around the restaurant. Additionally, the report can compare the routes traveled by a particular employee against the routes taken by other employees. Such a report can be in the form of a map, and can be run for an certain shift, or for a particular time period, such as for a determined time period (i.e., a chosen set of hours within a day) or a day, week, month, year, etc. After reviewing this information, the manager can coach the employee on how to increase productivity by changing movement behavior while on the job. Additionally, other information is generated from this data, such as how many miles a server walked during the shift, what percentage of the time they were idle (standing in one place), as well as many other data points based on the automatically tracked movement and path of the employee. For example, a manager can review how an employee spent their time within a two hour time frame during a given four hour shift. After reviewing the path of movement during those two hours, the manager can coach the employee on how to cut out wasted time by changing the employee's behavior on the job.

During operation, the employee location data is recorded with respect to each time interval. This location data is collected by the central unit 20 and then aggregated in order to show, either in real-time or retrospectively, the movement patterns employees took over a period of time. This data can be selected for one or more specific employees and for specific periods in time and then compared to other data sets. Thus, the system 10 can monitor how employees move about the establishment to allow the manager to analyze the efficiency of the server's movement.

Out of Range Notification

The system 10 also detects when an employee unit 14 or a customer unit 12 is out of the range. A device or unit is deemed to be out of range when a signal is not received from the unit for a predetermined period of time. When a unit is out of range, the central unit 20 notifies other employee units 14, the host station 16 and/or customer units 12 of the out-of-range unit. By notifying the other employees that a particular employee is out of range of the system, the other employees can be informed that they need to respond to (i.e., cover for) the out of range employee.

When an employee is out of range, the system 10 can accumulate or queue up any service requests that are intended for the out-of-range employee. When the employee comes back into range, these queued-up service requests can then be displayed on the employee's unit 14. The service requests for an out-of-range employee can also be relayed to other designated employees, so that the establishment's customers can be served as quickly as possible when an employee is out of range. In such an instance, the out-of-range employee can be notified via his/her unit 14 that a request was made by a particular table, and that the request was responded to by another employee and identify such other employee.

Assistance Request

The system enables employees to notify each other when they need assistance in responding to requests. The employee units 14 can be activated to transmit an "assistance request" signal. This signal is received by the central unit and transmitted to the other employee units. The "assistance request" signal can be transmitted to all the employee units 14, or only the employee units of the same type as which sent the assistance request. For example, if a waiter cannot respond to a service request, s/he can transmit an assistance request. This assistance request can be transmitted to all the employees, or to only the other waiters in the establishment. The information that is relayed to the other employees includes the identification of the employee requesting assistance, and the subject matter of the request. Hence, if a waiter requests assistance in responding to a customer service request, the central unit will transmit that service request to the other employees. One of the employees can then transmit a signal in return indicating that that particular employee will respond to the request on behalf of the requesting employee. Accordingly, any of the employee units 14 of the plurality of employee units is configured to be alerted of the fact that a particular employee requires assistance.

Manager Alerts

The various signals that are transmitted by the different units, and the information displayed on the various receiving units enable the system to automatically alert the employees of the establishment as to various guest conditions, employee conditions, table conditions, kitchen and bar conditions, etc., by the processing of system signals and streaming and displaying the signal related data on the receiving unit in real time.

As noted above, all signals are time stamped and recorded. With respect to request signals (i.e., customer request signals, employee assistance request signals, food/drink order ready signals), the system can, based on the time stamps of the signals, determine how long it takes for a request signal to be responded to. Additionally, with, for example, the stamping of out-or-range and location signals, the system can determine how long an employee is out-of-range. Further, the system can monitor a signal to determine if it has yet been responded to (i.e., if a condition exists for longer than a desired period of time), and alert the manager to such conditions. For example, when a "bus" signal is transmitted for a specified table, the system will monitor that signal and wait for the response to that signal (i.e., the "table ready" signal for that table). If, after a determined period of time, the response (i.e., "table ready") signal has not been received, the system can transmit a message to the manager via the manager's employee unit 14 that the table has not yet been bussed. The manager can then determine if the table has been bussed or if it still needs bussing. Similarly, the manager can be alerted when a table has been occupied for an extended period of time. This would be based on a "table seated" signal from the host station, the response signal being the "bus" signal. The manager, upon receipt of such an alert, can then visit the table to be sure that everything is okay at the table, and possibly try and move the table along, if it is a busy time period at the establishment. Other conditions the manager can be alerted to include, for example, if a customer request has not been responded to for a predetermined period of time, if an employee is out of range for a predetermined period of time, if a food or drink order has not been picked up within a determined period of time, etc. As can be appreciated, the manager can be alerted of other conditions as well. The system is flexible, and hence, the manager can choose which conditions he wants to be informed of and the time period that must elapse before the manager is alerted of the certain condition. For example, on a busy evening, the manager may want to be alerted of table bussing conditions or table occupancy conditions in a shorter time period than if the evening were not so busy.

Employee Evaluation

As noted above, the system 10 includes an evaluation program that utilizes the data tracked by the system to generate different reports. As noted above, the central unit records all the signals that are transmitted within the establishment and the time stamp information for each signal. This data includes the source of the signal (i.e., table number or particular employee), signal recipient (i.e., table number or particular employee), type of signal (i.e., service request, table clearing, etc), and time of signal. The data will also include response signals (i.e., request responded to, table ready, etc), the time of the response signal and the source of the response signal to provide information as to how long it took to respond to the original signal and who responded to the original signal. The system will also, as noted above, maintain employee location information.

The evaluation program can reside on the central unit within the establishment. The evaluation program can reside on a computer that is part of the system 10 which is located, for example, in the manager's office, or some other location within the establishment. Alternatively, the evaluation program can reside on a computer externally of the establishment. For example, the evaluation program can reside on a computer at a headquarter location (such as a local headquarter, regional headquarter, or national headquarter). If the program resides externally of the establishment, then the central unit 20 communicates with the computer on which the program resides over a network (such as a WAN or even over the Internet). Preferably, in the instance of a chain of establishments, the central unit 20 is in communication with various headquarter offices, so that the data of one establishment can be compared with the data of other establishments. Such comparisons can be made on a local level, state wide level, regional level or national level.

Automated Employee Performance Scores

The system 10 can provide continuous feedback to the employees of the establishment on the intangible aspects of their business operations such as customer service. During operation, the system collects and generates performance driven data. Such data can include, for example, time for responding to service requests, frequency and length of time of being out-of-range, frequency of requesting assistance, willingness to respond to assistance requests, etc. The system 10 collects the performance-driven data for the various employees and stores the data in the database.

Figure 11:
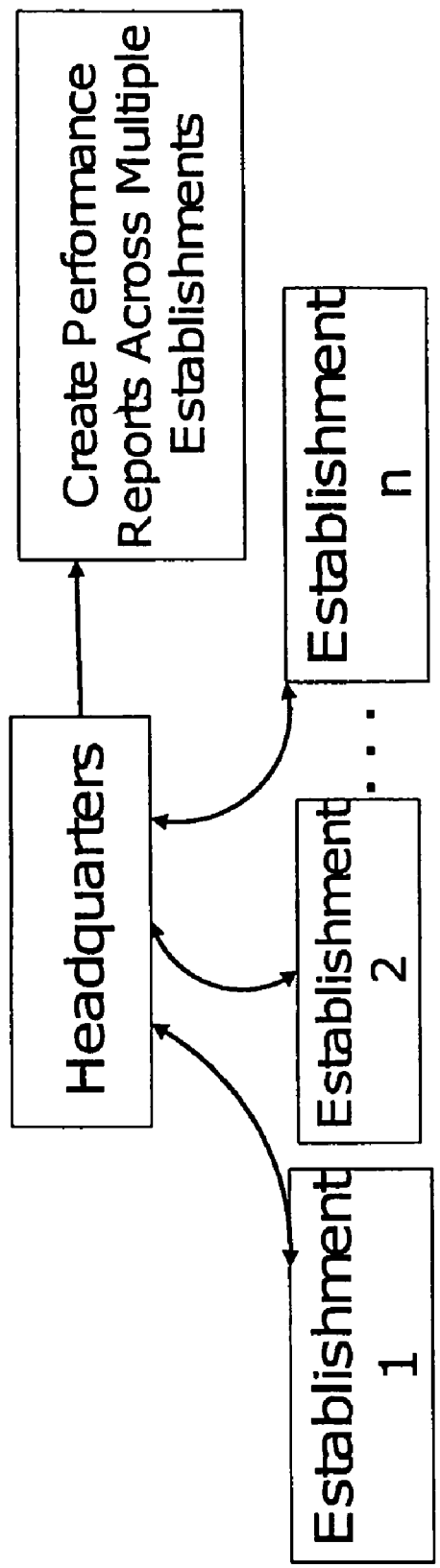
FIG. 11 is a block diagram showing the flow of information between multiple establishments and a headquarter location for the establishment to enable collection of data and report generation across the several establishments.

The data can be stored locally (i.e., in the central unit of an establishment), whether or not that establishment is part of a chain of establishments. However, in a chain of establishments, the data can be stored, for example, at a computer at a headquarter office for the chain. This headquarter office can be a regional headquarter office, a national headquarter office, etc. As shown in FIG. 11, the various establishments can upload their data to the computer at the headquarter office, and the data can be maintained there. In this instance, the computer at the headquarter office becomes part of the system 10.

The evaluation program uses the data in the database to compile a performance rating based on a performance formula (which can include any number of variables or computations according to the particular business at hand) with limited or no human interaction. The factors that can be considered in such a formula can include, but are not limited to, for example, time for responding to service requests, frequency and length of time of being out-of-range, frequency of requesting assistance and willingness to respond to assistance requests. As can be appreciated, the information used to generate the employee rating score will vary depending on the duties of the particular employee. Thus, the information factored into performance ratings for waiters, bussers and host/hostesses can be different. The employee performance rating is stored in the database, and is delivered to the managers' employee unit 14 and/or a manager computer. In addition, the performance rating can be delivered to the particular employee to inform the employee as to how the employee is performing according to the predetermined performance standards. Such predetermined performance standards can be determined from prior data. For example, if the data corresponds to time to respond to a customer request, then the standard can be based on an average response time by employees within the particular establishment or by an average response time by employees in a plurality of establishments in a chain of establishments. Based on the comparison of the waiter data to the performance data, the program can generate a performance rating for the respective employee. If the performance rating is delivered to the employee, the rating can be delivered to the employee on a real time basis, or can be delivered only if the rating falls below (or above) a predetermined level.

The performance ratings can be used to track the performance rating of an employee over time. Additionally, the performance rating of one employee can be compared against the performance ratings of other employees within the particular establishment. For a chain of establishments, the performance rating of a particular employee can be compared to the aggregate or average ratings of employees on a local, regional or even national level. Additionally, the aggregate or average rating of the employees of one establishment can be compared against the aggregate or average rating of employees at other establishments within a chain of establishments on a local, regional or even national level. In these instances, an establishment in a chain of establishments accesses the data from the computer at the headquarter office and runs the requested report based on such accessed data.

Additionally, the performance rating may be used in decisions as to promoting the employee within the establishment. In this instance, the manager could view how productive that employee was in the past, how the employee's performance rating has changed. This information, along with the manager's personal experience with the employee can be taken into consideration when promoting an employee.

As an example, a waiter turning tables within 55 minutes on average, generating 2.3 customer signals 20 per table on average (from the customer units 12 located at the tables), responding to those customer request signals in 1.7 minutes on average, etc., places the employee in the top 90% of his/her peers at that restaurant or at other restaurants also networked to similar systems 10. The performance rating data is automatically collected by the system 10, as noted above, and scored and ranked before being distributed to the manager's employee unit 14 to inform the manager of that employee's status. The rating can also be transmitted directly to that employee's unit 14, to let the employee know what kind of quality service is being provided by the employee. Additionally, other data originating from other technologies could be integrated into the productivity formulas, such as sales information for each specific server personnel.

The compiled performance rating can then be presented in report form or even streamed in wireless form to the manager. The performance rating can be viewed at the retail unit level as well as the corporate level (i.e. a remote location reviewing all sites' performance scores). The performance rating can be disaggregated down from the store level all the way to the specific server's performance for a given moment in time and compared to other servers at that unit level as well as employees off-site (i.e. on a territorial as a national level). Therefore, at the establishment and corporate level, the performance rating can be sent to another site as well as retrieved from other sources. By populating the database, reports for only specific moments in time (i.e. "flash reports") can be made available, as well as trend reports over a given period of time can be made available.

The compiled performance rating can impact real-time and automated training efforts so employees can "self-teach" themselves by performing on the job according to the predetermined standards defined in the system 10. If the employees generate lower scores than desired, the servers can self-correct their behavior according to suggestions which may be provided by the system in response to the performance rating (or the factors which went into determining the performance rating). For example, the system could transmit to the employee in real-time a message such as "Try to turn tables faster". Additionally, the performance rating can provide information to managers' employee units so the managers can know how each of their employees is performing according to the predefined performance standards as determined by the performance formula. This will allow the manager to streamline his/her operations and service model, figure out how to optimally staff the retail establishment, and make sure they know which customers might not be receiving acceptable customer service from their servers.

As an alternative, employees can be awarded points based on their productivity scores. These points can be displayed on the employees' units 14. In addition, the system can be provided with an in-store monitor located so as to be viewed by the employees; and the employees points can be displayed on the monitor. Employees can then compete to earn the most points. When productivity scores are based, in part, upon the employees willingness to respond to the assistance calls of their fellow employees, the competition to earn more productivity points will result in increased service to the customer.

Automated Productivity Reports

Customer service remains a leading contributor to a retail establishment's success and/or failure. Without being able to measure customer service down to each employee and each customer experience, managers of these retail establishments are unable to effectively manage one of the most important aspects of their business: customer service.

Each employee's behavior using the employee units 14 and customer units 12 as well as other peripheral devices (such as other monitoring and interactive devices located throughout the retail establishment and on their personnel) are monitored and tracked by the system 10. According to specific and adjustable productivity metrics and goals, each employee is scored and ranked, as previously discussed. At the end of each shift, managers are able to access data reports via printouts from the central unit 20 that show how productive each individual employee was, how each customer service experience was, as well as an aggregated view of how their establishment did from a customer service and productivity perspective as well. Managers will not only be able to use this data to optimize their service model and identify where their service bottlenecks are, but they will also be able to compare their location's operating data to other locations' operating data to see how their service and productivity scores compare to their peers.

During operation, a manager can access and print out a productivity report for his/her unit at the end of (or even during) the day to provide the manager with detailed information for each employee's productivity, where bottlenecks exist in the establishment, what suggested changes should be made to the service model, what optimal staffing model should be implemented, etc. The managers can also see how this data has trended over time. Additionally, managers can log-on and compare the data of their locations to other locations equipped with the same system to see how various components of their service model as well as their individual employees compare to the other locations. Access to the data of other establishments can be accomplished through a wide area network (WAN), the internet, or other types of networks.

Accordingly, the data processing system 10 measures the effectiveness of the establishment. Managers will also be able to compare their location's scores to other locations' scores, allowing them to see how the locations competitively rank and where the locations can improve their service/productivity in order to capture new and/or keep existing customers.

Staff Model Optimization Program

The complied performance rating provides a measurable way for the manager to forecast and to optimally staff their business in order to generate the most efficient operations and maximized sales possible, depending upon each employee's estimated/average productivity. As noted above, the system 10 stores data relating to operations by date and time of day. Such operations data include how busy the establishment is (i.e., which tables are occupied, the time to turn tables, etc.). Reports of such information can be generated for a particular time period (i.e., breakfast, lunch, dinner), for a particular range of hours, for particular days in the year, etc.

When the manager of a retail establishment is trying to determine which employees he/she would ideally like to staff during specific shifts for each shift/day/week/month, the managers can use an optimization program of the system 10 that factors in each employees' performance ratings for each day and type of shift. Hence, the optimization program will correlate the employee's performance data from similar types of days (i.e., if a day or shift is expected to be busy, then the system can recommend which employees generally work well on busy days or shifts). This optimization program forecasts the business dynamics for the upcoming period, based on the information of historical data stored in the database, and then suggests which specific employees would most optimally be staffed during the targeted time periods, based on certain, adjustable business objectives (e.g. generating lower costs, high revenues, better customer service, etc.).

In a restaurant, for example, the optimization program can allow a manager to determine the staffing for a particular time period such as the upcoming week. The optimization program recognizes what week it was in the calendar year and with reference to historical record of prior years predicts what the upcoming week will likely bring in the form of business. Based on this business projection as well as the primary business objectives selected by the manager in the optimization program, the optimization program provides suggestions on which employees should be considered for what shifts during that week based on the performance rating of the servers. The business objectives may include criteria such as reducing costs. Since reduced costs was selected in this example as a primary business objective by the manager, the optimization program searches for servers who were able to handle more tables than others while still generating adequate customer service scores based on the performance rating. Additionally, other data originating from other technologies may be integrated into this software sorting process, such as sales information for each specific employee/service personnel from terminals already within restaurants.

During operation, the employee performance rating assists forecast performance for each server, each unit, and each retail concept, which will help managers staff their model appropriately. Additionally, managers at the establishment level as well as executives at the corporate level can prioritize a set of business objectives in the system's software (e.g. table turn time=#1, labor savings=#2, etc.). Based on these prioritizations, and based on the past and future projected performance of each employee, the system 10 can suggest which employees should be staffed and when, how many tables they should be assigned, etc. in order to optimize operations, employee scheduling, and efficiency. Outside data/considerations may also be input into the optimization program (e.g. seasonal considerations, etc.). Each store's sales and financial data can be retrieved from another third party system and combined up with this system's productivity data. Based on recent changes in the staffing model, according to past data, the system can use the optimization program to calculate how accurate the suggested optimization changes in staffing, etc. were and adjust future suggestions.

For retail establishments, and in this example, restaurants, offering good customer service and running efficient operations is predicated upon the employees of that organization. In order for managers to run the most efficient, successful operation possible, they can benefit from having an automated tool that will suggest how to staff their business in order to yield their primary business objectives. Because this system can automatically generate, sort, and analyze productivity-oriented data down to the specific employee level, the managers can optimize their service model based on past employee performance, past business performance and current business objectives.

Customer Device

Retail establishments need demographic information of their customers in order to offer customized customer service as well as cater their marketing campaigns to be the most effective possible. Additionally, retail businesses need effective and memorable customer loyalty items that can be taken home by the customer and brought back to the store.

Each customer unit 12, as noted above, includes a reader 30 incorporated therein. A customer device containing customer information is read by the reader. The customer device can take numerous forms. It can comprise a magnetic strip on a card, in which case, the reader comprises a slot through which the card slides. The customer device can also comprise an RFID strip, which is read by an interrogator which reads the RFID strip. The customer device can be a disk-like device, which is inserted in a slot in the customer unit 12. If the customer device is a CD, the customer device can be provided with various types of information on it (e.g. music, information about the restaurant, advertisers, etc.) which can be displayed or played on the customer unit 12. Under this embodiment, the customer unit 12 plays music/video/media according to the content on the programmable device. The customer device can be writable or programmable, such that the customer data can be updated after each visit of the customer to the establishment. In another embodiment, the customer device can comprise a cellular phone having an infrared reader, which electronically reads the customer information.

After the customer information is read by the customer unit reader, the customer information can be downloaded from the customer device. After the customer device interacts with the customer unit reader 30, the customer unit 12 transmits a customer information signal which is relayed to the waiter for the particular table via the central unit 20. The customer data can then be displayed on the waiter's unit 14 and the waiter information (i.e., waiter name) can be displayed on the customer unit 12.

The reader may comprise a biometric sensor. In this embodiment, the customer may place a finger on the biometric sensor in order to generate and transmit the customer signal. The biometric sensor correlates the unique fingerprint with the appropriate stored customer information. In this instance, there would be no customer device. Rather, the customer information would be stored by the system, and once the customer passes, for example, his/her finger by the biometric sensor, the system would then recognize the customer. A biometric sensor can be used with other body parts as well, such as the eyes.

The customer unit 20 can be configured such that it will not work without the customer device, and the customer will not be able to wirelessly request service to their table. Once the customer device is recognized by the customer unit 12 (i.e., after the customer device has been read by the reader 30), the customer's specific information is wirelessly sent to the employee unit 14 of the employee responsible for the particular table. The transmission of customer information provides the necessary information for the server to offer a customized, more personal service experience for the customer.

Additionally, this customer device can serve as a unique customer loyalty tool. Each time the customer returns to the restaurant and inserts the customer device into the customer unit to be read by the reader 30, the customer can accumulate points, which can later be converted into value. It should be noted that this customer device may have advertisements on both sides of it. Additionally, the fact that the customer unit 12 may not work without the customer device provides some level of control to the server, enabling them to determine when to gift the customer device to new customers, thereby forfeiting some control to the customer. This unique function allows for a customized service experience for both the customer and the server, depending upon each individual situation.

In a restaurant, for example, when a customer returns to a restaurant, the customer activates the customer unit using the customer device. Once activated, the customer can use the customer unit 12 to wirelessly signal their server. Upon activation of the customer unit 12, the server will receive notice of the customer's specific information on his/her employee unit 14, such as the customer's name, when their last visit was, what they ordered last time, if they received good service, etc. Some of this information (such as prior order information) could be relayed to the employee unit when the waiter approaches the table. This could be accomplished, for instance, by using the proximity detectors or by the waiter sending an IR "information request" signal to the customer unit 12. In either event, the customer unit would send a signal containing the customer information which would be relayed to the waiter.

After the meal, the customer device can be reprogrammed (i.e., written to) to credit the customer with customer loyalty points, which the customer can cash in at a later date (for example, for a free appetizer after visiting the restaurant five times). In addition, order entries can be stored on the customer device. The customer information can be stored on the customer device 80 (in which case, the customer device is programmable), on a central computer within the system, or at a central computer for a group of locations. When the customers are finished with their meal, they can take the customer device 80 with them.

It should be noted that identification of the consumer through the customer unit 12 could also be accomplished by way of a biometric sensor. In this instance, the reader 30 would include a biometric sensor. Where the consumer puts their body part (i.e., fingerprint/thumbprint/eye iris pattern) onto a designated area of the customer unit 12, the customer unit would transmit a customer information signal to the central unit and/or the employee units 14. The biometric sensor may be independent of or in conjunction with the insertion of the customer device. The use of a biometric sensor could eliminate the need for a transportable customer device, and would eliminate the possibility of the customer device being lost. If a biometric sensor were used, then the customer information would be stored by the system 10.

Upon insertion of the customer device into the customer unit 12, the customer data that will have been stored on the customer device is read by the customer unit reader 30 and transmitted, via the central unit 20, to the employee unit 14 of the employee assigned to that table as well as other devices in the retail establishment as may be necessary. The customer information can include the customer's name, their purchasing patterns, when they were last at the establishment, etc. This information may be populated into the database with the other data from the system. It should also be noted that the customer unit 12 can be designed to only be "turned on" when the customer device is inserted into the reader 30 of the customer unit 12 (e.g. like a CD into a CD player). This could be done with a switch that is depressed once the customer device is inserted into the customer unit, thereby turning on the customer unit 12 and allowing user interaction and function. This activation capability may be with or without the data related content residing on the customer devices.

The customer device can be provided with an RFID tag, or some other detection means which will enable the establishment to detect when a customer enters the establishment. When the system detects that a customer enters the establishment, an "arrival" signal is transmitted to the central unit indicative of the fact that a customer has entered the establishment. This arrival signal will contain at least customer identification information. Upon receipt of the "arrival" signal, the signal will be time stamped and the signal data (i.e., the customer identification information and arrival time information) will be stored in a database. When the customer is seated at a table, the proximity detector of the customer unit of the table will detect that the customer has been seated, and the customer unit will then transmit a "customer seated" signal to the central unit, and the system will time stamp and record the information of the "customer seated" signal. The "customer seated" signal can include information identifying the customer, and can additionally include information identifying the table at which the customer is seated. As can be appreciated, the customer device can provide information as to how long customers wait before they are seated. Such information can be invaluable to a restaurant or other service establishment, in that the system, using this data, will be able to determine average waiting time for customers to be seated for different times of day and for different days of the week and different days of the year, etc. Such wait time information can be used by the restaurant to further help the restaurant in forecasting of future business requirements (i.e., staffing).

Using the customer device, the system 10 can also determine when a customer returns to the establishment. By recognizing the customer device, the system can determine, as noted above when a customer enters the establishment. Additionally, by reading the customer information on the device, the system can determine which customer is returning to the establishment. Reading the customer information can be accomplished at the customer unit 12, by an RFID tag interrogator when the customer enters the establishment, or by other means. If the customer unit 12 is to be used to read the customer information, then additional means, such as biometric sensors or IR readers which obtain customer information from, for example, cell phones or other mobile devices containing customer information, can be used.

The customer device offers retail establishments a functional, interactive, utility-creating, smart customer loyalty tool. It not only provides the establishment's employees with valuable customer information early on in the employee-to-customer exchange, but it will also track valuable demographic and purchasing information, enabling managers to have a much deeper knowledge of their customer.

Customer Surveys

The customer device 12 may be used for customer surveys by displaying and emitting programmable questions. Such questions can be programmed into the customer device or streamed to the customer device from the central unit. The customer survey can be initiated by the employee sending a signal (i.e., an IR or RF signal) to the customer unit, for example, when the employee provides the customer with the bill for the meal. Alternatively, the survey can be initiated based on average table turn-over times, and hence, would be automatically initiated by the system after a determined period of time elapsed. The system 10 would display survey questions on the display 26 of the customer unit. The customers could, in turn, answer the survey questions (or rate service) using the customer unit input device (i.e., a touch screen). The survey could be responded to in multiple ways. For example, a button could be held down as a bar progresses from "strong like" to "strong dislike"; the customer could be presented with "yes" and "no" buttons or "agree" and "disagree" buttons, number buttons, or any other type of button which would enable the customer to respond to the survey questions in a meaningful manner. The survey results would be transmitted to the central unit, where the customer survey information would be stored. The system 10 can transmit the survey results to the manager's unit 14 to alert the manager of customer satisfaction/dissatisfaction status before the customer leaves the restaurant. The evaluation program can use the survey information in generating the employee performance rating and form staffing recommendations. The evaluation program can correlate the survey information for a single employee, a group of employees, etc. for a given or selected time frame (i.e., one shift, a day, week, year, etc.). The survey data could also be used to improve restaurant operations.

Pay-at-the-Table Capabilities

At retail establishments, especially restaurants, customers often have to wait significant amounts of time to pay their bill in order to be able to leave. These delays lead to lower customer satisfaction levels and lost revenue from waiting customers who choose to leave because of the wait.

The system 10 can be adapted to enable customers to use with the customer unit 12 to pay for the goods and services they have purchased when they are ready to leave.

For example, the customer can activate a "pay" module which will then present the customer with a bill for the service. This bill would let the customer know what had been purchased and the total cost, including tax. The customer unit 12 could be provided with a printer to print out a copy of the bill. The customer could also indicate the amount of the tip the customer desires to pay. The tip amount would then be added to the bill total. The customer unit reader 30 can configured to read credit card information. In this case, the customer would pass his/her credit card through the reader 30, and the amount would be invoiced to the credit card. In another embodiment, a customer can use his/her cell phone to pay-at-the-table when they are ready to leave. The customer would line up a cell phone having infrared capabilities to the customer unit IR transceiver 22. The customer unit IR transceiver 22 would receive information from the cell phone indicating the cell phone number (and wireless service provider) assigned to that cell phone. Billing information would be passed on to the wireless service provided, which would pay the restaurant. The cost of the meal would then be placed on the customer's cell phone bill. This allows customers to exit the restaurant quickly after s/he maps his/her cell phone to the customer unit IR transceiver 22. After the customer pays (whether by credit card or cell phone), the customer unit will transmit a "paid" signal indicating that the customer has paid. The "paid" signal would be relayed to the responsible employee's employee unit 14, so that the employee would also be notified that the customer has paid.

In other forms, customers could use a wireless technology similar to "Speed-Pass" to pay the bill for the meal. Additionally, billing information can be associated with the customer device, and the customer device could be used at the end of the meal to automatically bill their meal to credit card account information already on record with the establishment.

This application streamlines the payment process, which is known as being one of the most frustrating points of the service experience for retail customers. It leverages an entity that already has the billing and account information for customers and it takes advantage of the ubiquity of cell phones or the simplicity of swiping a credit/debit card at the point-of-sale and/or using a "Speed-Pass" type solution and/or leveraging a smart chip embedded in the customer device.

Interactive Display on the Customer Transceiver

The customer unit display 26 can be an interactive display to provide retail establishments, especially restaurants, opportunities to up sell customers on incremental products, offer a unique customer experience, and offer valuable entertainment capabilities by having an interactive device at the point-of-sale. For example, the system can display, on the customer unit display, certain items on the menu, depending upon what items the restaurant wanted to highlight as well as based on what that table has already ordered (i.e. what up sells go well with what the customer already ordered). In order for the system to display pictures of what has been ordered, or what may go well with ordered items, the system will have to be adapted to transmit order information. As the customers order, the waiter would transmit the orders to the central unit (which would then relay the orders to the kitchen or bar unit). The system could then also transmit back to the customer unit images of what was ordered or what will go well with the ordered item(s). In this instance, the information displayed on the customer unit display could be streamed to the customer unit display. Alternatively, the information could be stored in the customer unit and the central unit can transmit a signal informing the customer unit what information to display.

In addition to photos of products and content or information about the products, the system 10 can also stream other content across the customer unit display 26. For example, items such as trivia, weather, sports scores, etc. can all be streamed across the customer unit display. Certain content can also be shown on the display 26 after the customers interact with the display.

As a further example, after a customer has activated the customer unit 12, the interactive display 26 can show what was ordered last time the customer was at that restaurant and how many customer loyalty points the customer has accumulated. This information would be based on the customer information stored either on the customer device or in the system 10. Throughout the meal and at specific times from the beginning, i.e., when customers are seated, (and these times are adjustable in the central unit), content is shown on the interactive display, such as trivia, up sell information, complimentary food and drink and dessert information, local weather, local movies and times, etc. Additionally, any time the customer physically interacts with the interactive display 26, the screen will display various, adjustable content.

These interactive capabilities will allow for a more fulfilling customer experience, enable retail establishments to capture incremental sales (since customers typically "buy with their eyes"), and empower the establishment to transmit or display certain dynamic content to their customers at specific times and events during the meal. As another example, retail customers often do not have a solid grasp of what items appeal to them (e.g. on the menu). Many people are visual learners and they benefit from being able to see the dishes they are considering before ordering. From the restaurant's perspective, this helps capture up sells. As customers request certain items and those items are inputted into an order entry device, which may or may not be part of the system 10, those requested items can be shown on the interactive display 26. Further, information about the specific items (such as ingredient or descriptive information) can be displayed on the display 26.

For example, if a customer decides they want to order a steak for dinner and the server unit 14 includes (or is in the form of) a handheld order entry device, then as the server inputs the steak order into their device, then a picture of that steak appears on the customer unit display 26. This allows customers to "buy with their eyes". Additionally, depending upon what each customer ordered, suggestive up sell images can be displayed throughout the meal. For instance, if the restaurant thought a certain dessert complimented steak very well, then a picture of that dessert is provided with certain information to the customer via the interactive display 26 later in the meal. The customer can then interacts with the interactive display 26 to signal an interest in ordering that item, or call the waiter via the customer unit 12 to order the item.

As orders and/or items are selected on, for example, a handheld order entry device, then the customer unit 12 can receive data telling the customers what orders/items were being inputted/selected. As the order information is received by the customer unit 12, the appropriate picture/content of those items stored in the system is displayed on the customer unit display 26. As noted above, this information can be streamed to the customer unit or stored in one of the customer unit memories.

Having the capability to offer customers visual examples of what they order and then having a means to signal their interest to order or to order that item via the customer unit 12 assists retail establishments to capture incremental revenue and lock in their existing customers by offering them a competitive differentiator that is at the point-of-sale.

In one embodiment, the interactive display 26 allows the customer to send signals to servers. For example, the interactive display 26 can prompt the customer whether the customer is ready for dessert, the check, etc. The customer responds via the interactive display 26, wherein the customer unit sends a "dessert" signal or "pay signal" to the waiter's employee unit 14 via the central unit 20.

Off-Premise Purchasing Capability

Customers at retail establishments often are interested in purchasing products and services (such as movie or theater tickets) off-premise from their current location. Because this typically requires them to travel from one location to another, sales are often lost, impulse buying opportunities are lost, and competition for those interested customers intensifies. The system 10 can allow customers to purchase other products and services that the current retail did not offer but were in close proximity to that retail establishment.

Retailers will use the customer unit 12 to display advertisements for off-premise products and services (in addition to their own products and services). Information relating to such off-premise products or services can be stored in the customer unit or in the central unit. In the later case, the information is streamed to the customer unit by the central unit for display on the customer unit display 26. When the customer sees something of interest, they interact with the interactive display 26 to purchase the desired good or service. The billing of that item can be completed in a number of ways. For example, the customer can purchase the item at the table using the customer device 12, as described above or, the item can be added to the customers charges for that particular meal (in the case of a restaurant).

To use the restaurant setting, a customer uses the customer unit 12 throughout their meal. During certain points in the meal, the interactive display 26 advertises off-premise items such as movies that are scheduled to start within the next hour at the near-by movie theatres. If customers are interested in purchasing a ticket to one of the shows, then they interact with the interactive display 26 to make the purchase. On their check, the customer is billed for the movie ticket costs (and possibly some mark-up cost that can be distributed to the restaurant) and then the customer can take their restaurant receipt, which offers proof of purchase to the theatre for admission.

Specific offers could be generated at the customer unit 12 via radio frequency. When the consumer interacts with the customer unit 12 (e.g. after biometric capabilities (finger print), voice, physical interaction, etc.) after a promotion is made (i.e. audio or visual) for an off-premise product/service (e.g. movie tickets), then the system can send a confirmatory message to another device (i.e. host station or manager's computer). The amount charged is added to the dining bill, for example, and then the proof of purchase comprises the check (which is printed out at the end of the meal). People would then be able to take that proof of purchase to the off-premise provider.

Specialized retail establishments are often located in "clusters". If one retail establishment could offer products and services of another non-competing retail establishment (e.g. restaurants versus movie theatres), then the customer benefits through increased levels of choice, the restaurant benefits from increased customer frequency and possible revenue sharing agreements with the third party retailers, and the third party retailers benefit by capturing incremental revenue from a captivated, local audience.

Employee Unit Visual Display

Retail and customer service industries often have a fast-paced work environment. When an employee receives a signal on his/her respective unit 14, the employee needs to be able to glance at the employee unit display quickly. If the signal is not easy to see, then this could slow down the employee and cause them to be resistant to the technology. To facilitate easier viewing of signals, for a temporary period (for example, for four seconds), the received message will be enlarged and displayed, for example, on the entire screen of the employee unit. This will offer the server a greater degree to quickly see the content of the message. After being shown in the large visual format, the message will shrink back down into a visual queue of messages, which could be sorted in a certain order (e.g. FIFO, sorted by priority according to intelligence within the system, sorted by front of the house versus back of the house, etc.). The display could also separate customer request signals from kitchen/bar signals, employee assistance signals, etc. Additionally, depending upon what kind of message it is (i.e. customer request signal, kitchen or bar signal, request for assistance signal, etc.), the employee unit may have differentiated vibration patterns (when a message is received) in order to provide a form of physical response to the user (in addition to the visual response) to let the employee know what type of signal is received prior to glancing at the employee unit display 44.

As another example, when a server is wearing the employee unit 14 and a customer uses the customer unit 12 to request service via the customer signal, the server receives a single vibration on their employee unit 14 and for four seconds that table number and an icon symbolizing a customer service request is enlarged on the employee transceiver's display. After that four-second period, the message shrinks back down to size and is placed in a queue that separates table messages (i.e. front-of-the-house) and kitchen/bar messages (i.e. back-of-the-house). When the server receives a message from the kitchen, a two-blast vibration may register on their employee transceiver, the message being temporarily blown-up for four seconds and then shrinks back down to its respective queue in the bifurcated display.

Employee Productivity Data & Customer Specific Data Reporting

Without being able to measure each employee's relative productivity, managers are unable to use that data to their advantage to encourage, motivate, and measure their employees' value. Additionally, managers are unable to create a more competitive, fun work environment without this data. This often contributes to high hourly employee attrition, which can cost retail establishments significant dollars in training, recruiting, marketing, and retention.

In the present, employees wear/carry employee units while customer units as well as other detection devices are distributed throughout a retail establishment. Each distinctive event that occurs for each employee and customer is time-stamped and recorded in the central unit. This data can then be sorted, scored, and ranked for each employee in order to measure their relative productivity to their peers. Once these individual scores are established, the scores are compared to other scores either within that given retail establishment, or are compared to a regional or national pool of participants using the same or similar system at their retail establishment. As such, every event is collected and time-stamped by the system. The central unit collects, analyzes and presents the data at the employee level, store level, area level, regional level and corporate headquarter level. Additionally, the data is collected, analyzed and presented across connected stores in cities, states and countries. By networking this information and displaying it to the employees, the system creates a more fun, dynamic work place where the employees not only compete to get high productivity scores for themselves, but also benefit themselves relative to their peers.

To use the restaurant setting, servers are automatically assigned productivity scores as they work and as the system time-stamps and collects productivity driven data. These scores can then be displayed on a monitor (i.e., TV screen) located somewhere in the restaurant, showing how each employee is doing relative to their peers. Under the networked scenario, the TV screen lists the employees working at that location. Employees at other locations could be listed as well. Alternatively, the monitor could display how the establishment is performing relative to other establishments in a chain of establishments. The same concept can be applied to customers. Since the system collects customer-specific data (e.g. including data like demographic info, purchasing patterns, frequency of visits, etc.), customers can be scored and ranked based on a number of factors. This data is collected as described above and then simply networked over an existing network platform to a variety of peripheral devices, like TVs.

This capability will help retain workers due to a more fun work environment (i.e. it makes their job seem more like a video game which can appeal to the younger employee demographic) and the restaurant should benefit from increased levels of productivity through a more competitive work environment. The system can also award points to the employees based on their productivity and performance ratings. From the customer perspective, this can help create a more loyal customer base, given that the more customers patron a certain establishment, the more points they would receive which is public recognition and appreciation for their business.

To use the restaurant setting, the hourly employee base (i.e., waiters and bussers) sometimes turns over 150% per year. This has serious implications on training resources and the quality of customer service. Studies have also shown that the most effective training-related learning occurs in real-time and on the job. Without software that can correct employees' behavior in real-time, the employees will be less likely to change their behavior and accelerate up the learning curve quickly in order to avoid delivering poor customer service over a prolonged period of time.

In the restaurant example, the system employs automated training software that can stream messages to employees during their shift that suggest how the employee could become more efficient. For example, a waiter may have text being streamed to them when it takes too long to turn a table, when the kitchen order was been sitting too long before it was picked up, if their tables had requested them too many times, or if a customer service request from a customer transceiver is made near the end of the meal to print out the check before they respond to that table.

The employee unit receives information at timed intervals about specific events and even specific devices (e.g. specific customer units). As that information is received, the employee unit displays certain content (either pre-programmed or on the fly programmed content). Additionally, other employee responses include a vibration applied to the employee prior to the display of the training message.

Battery Management

During operation of the system, each device monitors its battery charge state and notifies the central unit of the respective battery charge state. Furthermore, if the battery begins to run low on power, the central unit can adjust the power consumption characteristics (power, frequency, LCD on/off, LCD backlight, sensitivity, length of display and length of vibration) of the customer and employee units so that they consume less power. The employees can further be informed of the low power supply and prompted to exchange their unit 14 for a fully charged unit 14. If a low power condition for a particular unit is found to exist, a notification of such condition can be displayed at the host station.

Anti-Theft

The devices can also include an anti-theft feature which sends a theft signal to the central unit 20 when the anti-theft feature determines that a unit is being stolen. For example, the customer units (which should remain stationary) can include level and/or motion sensors which detect when the device is being moved. Upon detecting movement of the device, the customer unit can send a "theft" signal to the central unit. If the unit is in fact stolen and removed from the premises, the unit can then be declared as being lost. When a "theft" signal is transmitted by a unit, a notification will be displayed, for example, on the host station.

Central Unit

The central unit, as described above, performs essentially two functions. One of the functions is as a relay unit. As a relay unit, the central unit receives all transmitted signals, and using the look-up tables relays the signal to the appropriate individual. As discussed above, and in the above noted U.S. Pat. No. 6,366,196, relaying the signal can include adding information to the signal identifying the recipient of the signal. Hence, the relayed signal would in fact be received by all units, however, only the designated recipient would process the signal. The second function of the central unit is the storing of all the signal information in the database 78 (i.e., maintaining the database) and the processing of the signal information using the evaluation program 80. Hence, the central unit comprises a relay unit and a data processing unit. These two functions or units of the central unit can be separated. In this instance, the relay unit would comprise at least a transceiver (to receive and send signals), a database containing the look-up tables, a processor (to process the signals), and necessary memory. The data processing unit would then include the database of signal information, the evaluation program 80, a processor, an input device, a display, and necessary memory. In addition, the data processing unit would include at least a transceiver. The transceiver would be required so that the relay unit would relay all signals to the data processing unit so that the signal information can be stored and processed. In addition, the data unit would need to transmit signals, for example, to alert the manager to various conditions, as noted above. The clock 77 and the RF Channel Identification Processor 74 could be incorporated in either the relay unit or the data processing unit.

If the relay unit and the data processing unit of the central unit are separated, the relay unit can be placed in the establishment at a location where it is best able to receive the signals to optimize signal transmission. The data processing unit can then be positioned in any desired location within the establishment. The data processing unit could be its own separate unit, in which case, it could be located for example, in the manager's office. Alternatively, the data processing unit could be combined with one of the stationary units, such as the host station, for example. While the data processing unit is preferably positioned on site, to facilitate the many functions of the system, the data processing unit could also be positioned off-site and be remotely located. In this instance, the data processing unit could be at a central location or at a headquarters location. If the data processing unit were remotely located, then the units of the establishment, and in particular, the relay unit of the central unit, would need to be constantly in communication with the data processing unit. Such communication could be accomplished over a wired network, or could be accomplished over the internet or via a wireless communication system. If the data processing unit were remotely located, then, in a chain of establishments, a single processing unit could be used for multiple establishments.

In another variation, the relay unit of the central unit could be eliminated altogether. In this instance, the various units (i.e., the customer units, the employee units, the kitchen and bar units, and the host station) would include, in their transmitted signals, information identifying the recipient, and the signals would additionally be received by the data processing unit for recordal.

Remote Processing Center

Turning to FIG. 11, the systems of the different establishments can be in communication with a headquarters location, and the data from the different establishments can be uploaded to the headquarters location. The various establishments can each maintain their own databases, or the headquarters location can maintain the database for the different establishments. In the later case, the data processing unit, as described just above, would be located in the headquarters location. With this remote processing center, reports can be generated which cover the chain as a whole or selected parts of a chain (i.e., a region, or sub-region). The operations of different establishments within the chain can be compared, and the ratings of employees of a specific establishment can be compared against the ratings of employees of other establishments within the chain as a whole, or a region or sub-region (i.e., state, city, etc.) of the chain.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense. For example, the transmission of information via IR beam could be accomplished using RF energy. The employee unit 12 can take numerous different forms. It can for example be a watch type device (which could be worn as a pager or about a wrist) or a clip-board sized device (which would then be carried by the employee. The central unit 20 is described to be part of the host/hostess station. However, the central unit 20 could be located at another location within the establishment and could be separate from the host/hostess station. For example, the central unit could reside in the manager's office. Although the various units 12, 14, 16, 17, 18 and 20 are described to include transceivers, the transceivers could be replaced with individual transmitters and receivers. This would be true for both the RF transceivers and the IR transceivers. These examples are merely illustrative.

The invention claimed is:

1. A service personnel system for use in a retail establishment, the system comprising:
   a plurality of customer units, each customer unit being adapted for transmitting and receiving a signal of a determined type; said signal transmitted by said customer unit containing information identifying the customer unit and the type of signal being transmitted;
   a plurality of employee units; each employee unit being adapted for transmitting and receiving signals of a determined type; said signal transmitted by said employee unit containing information identifying said employee unit and the type of signal being transmitted;
   a signal relaying means for receiving said signals from said customer and employee units and relaying said signals to at least one of said customer and employee units; said relayed signal containing information identifying the unit which transmitted the signal that was relayed, the unit which is to receive the signal, and the type of signal;
   stamping means for time stamping said signals;
   data collecting means for collecting employee service data; said data comprising said signals and the time stamp for said signals;
   recording means for storing said employee service data;
   analyzing means for analyzing said employee service data; and
   report means for generating a report from said employee service data.

2. The system of claim 1 wherein said collecting means includes means for determining the response time for an employee to respond to a request signal.

3. The system of claim 2 wherein said means for determining the response time comprises means for determining when an employee has responded to a signal comprises, means for transmitting a respond signal, said time stamping means, and means for comparing the time stamp of said request signal with the time stamp of said response signal; said respond signal being indicative of fact that said signal has been responded to.

4. The system of claim 3 wherein said means for transmitting said response signal comprises one of said employee units and said customer units.

5. The system of claim 4 wherein said employee unit comprises means for transmitting a signal to said customer unit in response to a request signal; said means for transmitting said response signal comprising said customer unit.

6. The system of claim 5 wherein said employee unit comprises an IR transmitter and said customer unit includes an IR receiver; said signal transmitted from said employee unit to said customer unit comprising an IR beam.

7. The system of claim 3 wherein said means for determining when said employee responds to said customer signal includes means for determining when said employee unit is within a predetermined distance of said customer unit; one of said customer and employee units transmitting said response signal when said employee unit is determined to be within a predetermined distance of said customer unit.

8. The system of claim 7 wherein one of said employee unit and said customer unit includes an RFID tag and the other of said employee unit and customer unit includes an interrogator; said interrogator sensing said RFID tag when said RFID tag is within said predetermined distance.

9. The system of claim 1 including report generating means for generating reports based upon said employee data; said reports ranking the performance of employees within an establishment or within a group of establishments.

10. The system of claim 1 comprising means for determining a performance rating for an employee based on said employee data.

11. The system of claim 10 means for determining said performance rating comprising means for comparing the performance data for a specific employee against a determined standard.

12. The system of claim 10 including means for transmitting a prompt based upon the performance rating is transmitted to the employee unit; said prompt providing information to said employee as to how to improve performance.

13. The system of claim 1 including means for storing historical business information; said system including staffing means for recommending staffing for said establishment based upon said historical business data and said employee data.

14. The system of claim 1 including means for enabling employees to wirelessly request assistance from each other and means fore wirelessly responding to such assistance requests.

15. The system of claim 14 wherein said means for requesting assistance comprises said employee units; said employee unit being activatable to transmit an assistance request signal; said assistance request signal identifying the unit transmitting said assistance request signal; said assistance request signal being received by one or more other employee units; said employee units further comprising a display to display said assistance request signal information; and said means for responding to said assistance request signal includes said employee units; said employee units being activatable to transmit a response signal.

16. The system of claim 15 wherein said system comprises means for analyzing said signal information to generate an employee performance score.

17. The system of claim 1 wherein said establishment includes a plurality of types of employees; said system including interchanging means for enabling said employee units to be used by any type of employee.

18. The system of claim 17 wherein said interchanging means comprises means for informing said system which employee will be using a particular employee unit.

19. The system of claim 1 including means for alerting a manager as to a predetermined condition within the establishment.

20. The system of claim 19 wherein said alerting means comprises means for determining when a determined condition exists; said system transmitting a signal to the manager employee unit indicative of the fact that such condition exists.

* * * * *